(12) United States Patent
Fujita et al.

(10) Patent No.: US 8,911,092 B2
(45) Date of Patent: Dec. 16, 2014

(54) ILLUMINATING DEVICE, PROJECTING DEVICE, AND METHOD FOR CONTROLLING PROJECTING DEVICE

(75) Inventors: Kazuhiro Fujita, Tokyo (JP); Tatsuya Takahashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 56 days.

(21) Appl. No.: 13/553,168

(22) Filed: Jul. 19, 2012

(65) Prior Publication Data
US 2013/0021582 A1 Jan. 24, 2013

(30) Foreign Application Priority Data

Jul. 22, 2011 (JP) ................................. 2011-161276
Mar. 19, 2012 (JP) ................................. 2012-062846

(51) Int. Cl.
*G03B 21/00* (2006.01)
*G03B 33/06* (2006.01)
*H04N 9/31* (2006.01)
*G03B 21/20* (2006.01)

(52) U.S. Cl.
CPC .............. *G03B 21/204* (2013.01); *G03B 33/06* (2013.01); *H04N 9/3158* (2013.01); *H04N 9/3161* (2013.01)
USPC .................. 353/31; 353/84; 353/85; 353/94; 353/98; 353/99; 362/84; 362/231

(58) Field of Classification Search
USPC .......... 353/84, 85, 31, 94, 98, 99, 122; 362/2, 362/293, 84, 231, 510; 348/342, 743–747, 348/786; 349/5, 7–9
See application file for complete search history.

(56) References Cited

U.S. PATENT DOCUMENTS

| | | | | |
|---|---|---|---|---|
| 6,259,103 B1 * | 7/2001 | Pressnall | | 250/483.1 |
| 8,337,027 B2 * | 12/2012 | Ogura et al. | | 353/85 |
| 8,348,432 B2 * | 1/2013 | Miyazaki | | 353/31 |
| 2011/0063581 A1 * | 3/2011 | Iwanaga | | 353/31 |
| 2011/0075103 A1 * | 3/2011 | Ogawa et al. | | 353/31 |
| 2011/0149549 A1 * | 6/2011 | Miyake | | 362/84 |
| 2011/0205502 A1 * | 8/2011 | Kato et al. | | 353/84 |
| 2011/0228232 A1 * | 9/2011 | Sakata et al. | | 353/31 |
| 2012/0062857 A1 * | 3/2012 | Saitou et al. | | 353/98 |
| 2013/0221826 A1 * | 8/2013 | Okumura | | 313/45 |
| 2014/0125956 A1 * | 5/2014 | Chifu et al. | | 353/31 |

FOREIGN PATENT DOCUMENTS

| | | |
|---|---|---|
| JP | 2004-341105 | 12/2004 |
| JP | 2009-277516 | 11/2009 |
| JP | 2012-42735 | 3/2012 |

* cited by examiner

*Primary Examiner* — Sultan Chowdhury
(74) *Attorney, Agent, or Firm* — Oblon, Spivak, McClelland, Maier & Neustadt, L.L.P.

(57) ABSTRACT

An illuminating device for emitting light onto a light modulating element that forms an image in accordance with a modulation signal and irradiates a target to be illuminated with light, the illuminating device includes a substrate on which equal to or more than two phosphors that emit light with exciting light are formed in a band-like form along a predetermined direction, equal to or more than two light collecting units that are arranged for the respective equal to or more than two phosphors, and collect light components emitted from the respective equal to or more than two phosphors, and a driving unit that drives the substrate in the predetermined direction.

17 Claims, 15 Drawing Sheets

ILLUMINATING DEVICE, PROJECTING DEVICE, AND METHOD FOR CONTROLLING PROJECTING DEVICE

CROSS-REFERENCE TO RELATED APPLICATIONS

The present application claims priority to and incorporates by reference the entire contents of Japanese Patent Application No. 2011-161276 filed in Japan on Jul. 22, 2011 and Japanese Patent Application No. 2012-062846 filed in Japan on Mar. 19, 2012.

BACKGROUND OF THE INVENTION

1. Field of the Invention

The present invention relates to an illuminating device that emits a plurality of beams of which colors are different from one another, a projecting device, and a method for controlling a projecting device.

2. Description of the Related Art

Conventionally, information can be shared with attendants in a conference or the like by projecting screen information of an information processor such as a personal computer (PC) onto a screen using a projector.

In such a projector, a high-luminance discharge lamp such as an extra high pressure mercury lamp is used as a light source predominately in a conventional technique. The discharge lamp can realize high luminance at low cost. However, an alternative light source is desired because the discharge lamp takes time to provide a predetermined amount of light emission from the start of lighting and involves some environmental concerns.

To address this issue, solid light emitting elements such as light emitting diodes (LED) of red (R), green (G), and blue (B) and organic electroluminescence (EL) devices have been developed to be used as a light source that is an alternative to the discharge lamp in a projector and have been put into practical use. The projector can be activated at high speed and environmental concerns can be eliminated by using these solid light emitting elements as the light source of the projector.

A technique of obtaining light components of various colors using a blue laser or a light emitting diode that emits light of blue, as one of the solid light emitting elements, has been put into practical use. For example, when the blue laser is used, if laser light output from the blue laser is emitted onto a phosphor, the phosphor is excited and light of a color unique to the phosphor is emitted. By using this characteristic, light components of colors of R, G, and B can be obtained. Furthermore, a technique of using the light obtained by the phosphor as a light source of a projector has been developed. Gradations of the light components of the colors of R, G, and B obtained as described above are controlled by using a spatial light modulating element such as a digital micromirror device (DMD) for each pixel so as to obtain a color projected image.

It is to be noted that when a blue laser is used as a light source of a projector, for example, if one laser diode is used for one color, a light amount is insufficient. Therefore, in general, a laser diode array in which several to several dozens of laser diodes are configured integrally is used as a light source.

Japanese Patent Application Laid-open No. 2004-341105 discloses a projection-type display device having a light emitting diode, a phosphor layer that converts ultraviolet light emitted by the light emitting diode to visible light, and a transparent base material.

According to Japanese Patent Application Laid-open No. 2004-341105, a disk is divided into three regions. Furthermore, a visible light reflecting film through which ultraviolet light is transmitted and that reflects visible light is formed on each region at an incident side and a phosphor layer that converts a wavelength of the ultraviolet light into a wavelength of each color of R, G, and B is formed on each region at an emitting side opposed to the incident side with a transparent layer interposed therebetween. If the disk is rotated, the ultraviolet light from a light source is converted into light components having wavelengths of R, G, and B by the phosphor layers in the regions. Then, repetitious color light components of R, G, and B are emitted. The color light components are emitted on a spatial light modulator, so that optical modulation is performed on the light components. Then, the modulated light is projected onto a screen through a projection lens in an enlarged manner.

Japanese Patent Application Laid-open No. 2009-277516 discloses a light source device and a projector in which phosphor layers are arranged in a plurality of segment regions of a circular transparent base material, and visible light of which energy is lower than ultraviolet light is emitted onto phosphors as exciting light so as to obtain light components of colors.

In the conventional techniques as disclosed in Japanese Patent Application Laid-open No. 2004-341105 and Japanese Patent Application Laid-open No. 2009-277516, the disk is radially divided into a plurality of regions, phosphor layers that emit different colors are formed in the divided regions, and the disk is rotated, so that light components of the colors are emitted in a time-division manner. Therefore, laser light is emitted onto a limited area in a concentrated manner on the phosphor layer of each color, so that the irradiated portion is made into a so-called "burned" state. This may deteriorate the characteristic of the phosphor layers.

In order to prevent deterioration of the characteristic of the phosphor layers due to irradiation of the laser light on a specific portion of each color in a concentrated manner, it is considered that the disk is not divided into regions of the colors and a disk including a phosphor layer for each color is provided. This requires disks corresponding to the number of colors in one device, resulting in increased cost and device size.

There is need to reduce the size of a device in which a phosphor is excited to obtain light of each color at lower cost.

SUMMARY OF THE INVENTION

It is an object of the present invention to at least partially solve the problems in the conventional technology.

According to an aspect of the embodiment, there is provided an illuminating device for emitting light onto a light modulating element that forms an image in accordance with a modulation signal and irradiates a target to be illuminated with light, the illuminating device including: a substrate on which equal to or more than two phosphors that emit light with exciting light are formed in a band-like form along a predetermined direction; equal to or more than two light collecting units that are arranged for the respective equal to or more than two phosphors, and collect light components emitted from the respective equal to or more than two phosphors; and a driving unit that drives the substrate in the predetermined direction.

According to another aspect of the embodiment, there is provided a projecting device that projects an image based on image data, the projecting device including the illuminating device mentioned-above equal to or more than two light sources that irradiate the respective equal to or more than two phosphors with the exciting light; a projecting optical system that projects light components that have been emitted from the equal to or more than two phosphors and collected by the equal to or more than two light collecting units onto a display medium; and a controller that controls the equal to or more than two light sources to light up sequentially in one frame period of the image data.

According to still another aspect of the embodiment, there is provided a method for controlling a projecting device that projects an image based on image data, the method including: driving, by a driving unit, a substrate on which equal to or more than two phosphors that emit light with exciting light are formed in a band-like form along a predetermined direction in the predetermined direction; and controlling, by a controller, equal to or more than two light sources that irradiate the respective equal to or more than two phosphors with the exciting light to light up sequentially in one frame period of the image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

Figure 1:
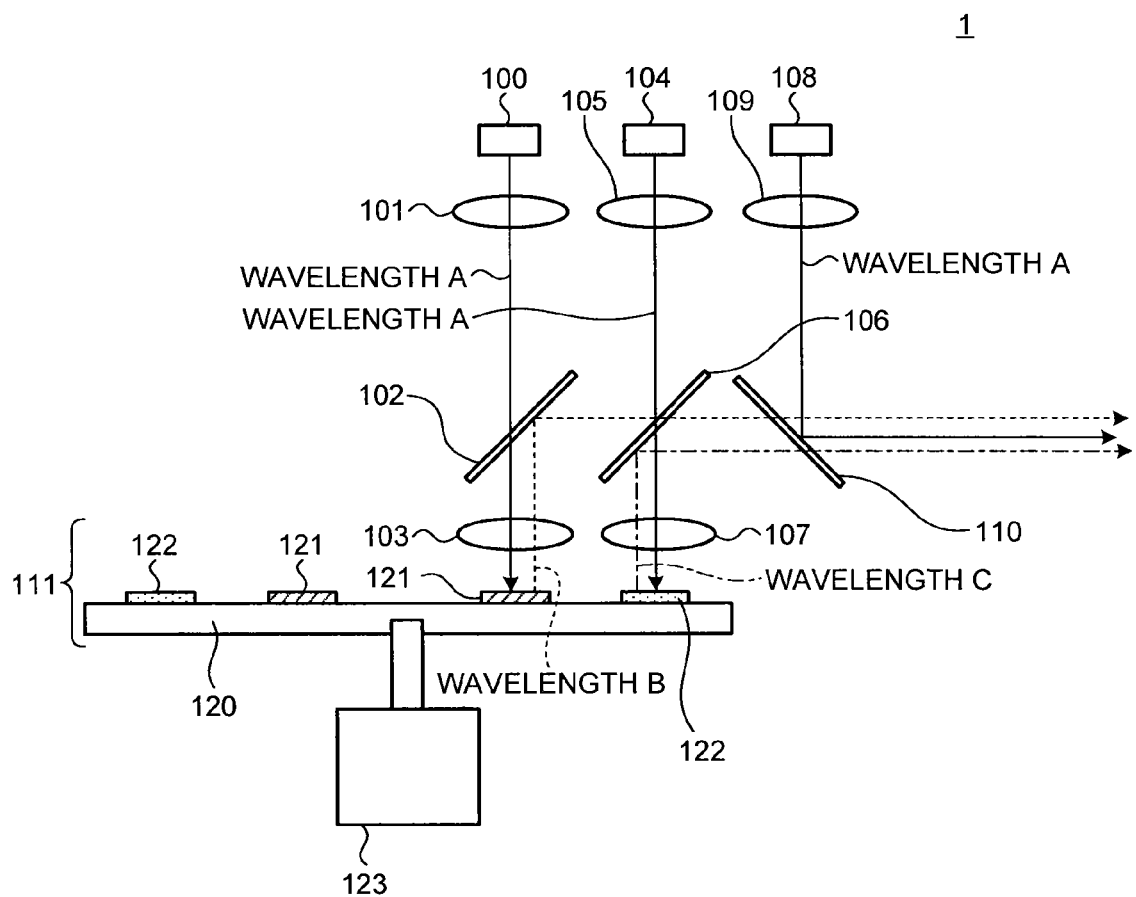
FIG. 1 is a schematic view illustrating an example of a configuration of an illuminating device according to a first embodiment.

Hereinafter, embodiments of an illuminating device and a projecting device are described in detail with reference to the accompanying drawings. FIG. 1 illustrates an example of a configuration of an illuminating device 1 according to the first embodiment. The illuminating device 1 includes light sources 100, 104, and 108, coupling lenses 101, 105, and 109, dichroic mirrors 102, 106, and 110, and a phosphor wheel unit 111. The phosphor wheel unit 111 includes light collecting elements 103 and 107 as light collecting units, a substrate 120, band-like phosphors 121 and 122, and a driving unit 123.

In FIG. 1, the light sources 100, 104, and 108 are light emitting elements that emit light components having short wavelengths. For example, blue lasers that emit a laser light component of blue can be used as the light sources 100, 104, and 108. The light sources 100, 104, and 108 may be light emitting diodes that emit a light component of blue. Each of the light sources 100, 104, and 108 emits light rays having a wavelength A (for example, range of wavelength of 400 nm to 450 nm) of blue light.

Figure 2:
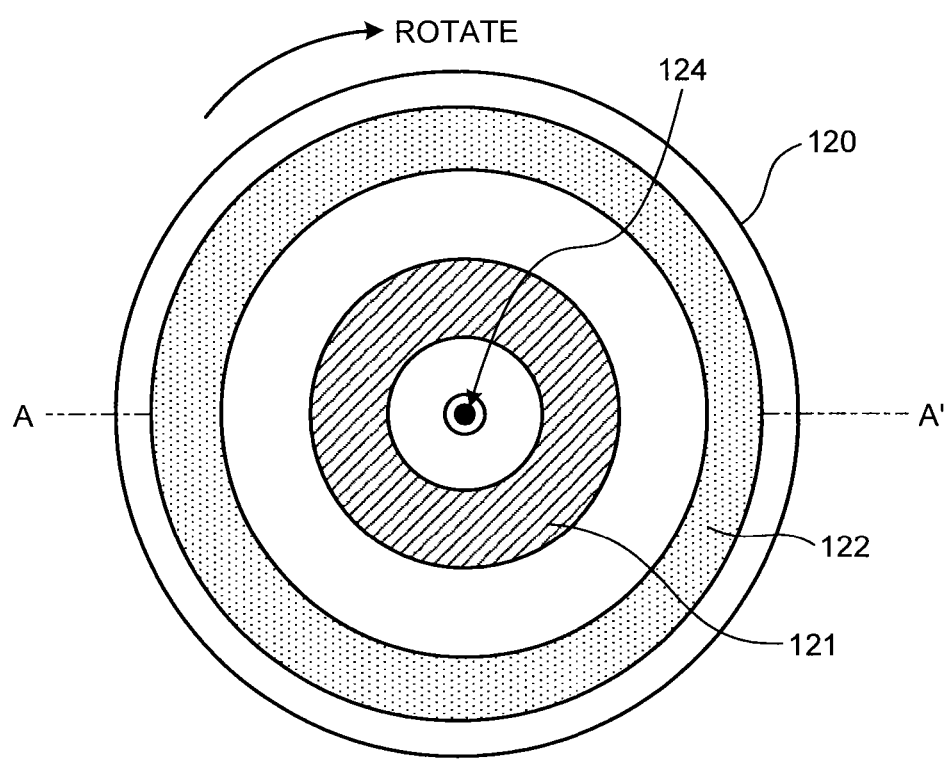
FIG. 2 is a schematic view illustrating a substrate according to the first embodiment when seen from a surface on which phosphors are formed.

FIG. 2 is a view illustrating the substrate 120 on the phosphor wheel unit 111 when seen from a surface on which the phosphors 121 and 122 are formed. The substrate 120 described with reference to FIG. 1 corresponds to a cross section thereof cut along line A-A' of the substrate 120 in FIG. 2. The phosphors 121 and 122 are formed on the substrate 120 formed by a reflecting member on concentric circles in band-like forms having predetermined widths. The center of the concentric circles is set to a rotation center 124, and the substrate 120 is rotationally driven about the rotation center 124 by the driving unit 123.

The phosphor 121 is excited by light having the wavelength A so as to emit light having a wavelength B that is longer than the wavelength A. The wavelength B is a wavelength of red light in a range of 620 nm to 750 nm, for example. On the other hand, the phosphor 122 is excited by light having the wavelength A so as to emit light having a wavelength C that is longer than the wavelength A. The wavelength C is a wavelength of green light in a range of 495 nm to 570 nm, for example. In this example, each of the phosphors 121 and 122 is formed in a band-like form. The phosphors 121 and 122 are not limited thereto and may be formed as follows. That is, a disk-like substrate is radially divided by a predetermined amount and the phosphor 122 is formed at the outer side and the phosphor 121 is formed at the inner side, for example.

It is preferable that the phosphor 122 that emits light having the wavelength C, that is, light of green be arranged at the outer side with respect to phosphors that emit light components of other colors. Luminous efficiency of green light is higher and the highest light output is required for the green light. Therefore, if the phosphor 122 is formed on an outer portion of which circumference is long and area can be ensured to be large, output of the green light can be obtained more stably.

The dichroic mirror 102 is configured to reflect light having the wavelength B and transmit light components having the wavelength A and the wavelength C. The dichroic mirror 106 is configured to reflect light having the wavelength C and transmit light components having the wavelength A and the wavelength B. The dichroic mirror 110 is configured to reflect light having the wavelength A and transmit light components having the wavelength B and the wavelength C.

Each of the light collecting elements 103 and 107 is configured so as to transmit light having a predetermined wavelength selectively. In this example, the light collecting element 103 can transmit light having the wavelength A that is incident from the side of the light source 100, and transmit light having the wavelength B that is incident from the side of the phosphor 121. The light collecting element 107 can transmit light having the wavelength A that is incident from the side of the light source 104, and transmit light having the wavelength C that is incident from the side of the phosphor 122.

Optical paths on the illuminating device 1 are described with reference to FIG. 1. First, an optical path of light from the light source 100 is described. Light rays having the wavelength A that have been emitted from the light source 100 are collimated by the coupling lens 101, transmit through the dichroic mirror 102, and are incident on the light collecting element 103. The light collecting element 103 collects the incident light rays having the wavelength A on the substrate 120, and irradiates the phosphor 121 with the collected light rays. The phosphor 121 is excited by the light rays having the wavelength A as exciting light so as to emit light having the wavelength B. The light having the wavelength B is incident on the light collecting element 103 functioning as a light collecting unit for light having the wavelength B. The light having the wavelength B is collected by the light collecting element 103 selectively, and is emitted to the dichroic mirror 102. The light having the wavelength B is reflected by the dichroic mirror 102, further transmits through the dichroic mirrors 106 and 110, and is emitted from the illuminating device 1.

Next, an optical path of light from the light source 104 is described. Light rays having the wavelength A that have been emitted from the light source 104 are collimated by the coupling lens 105, transmit through the dichroic mirror 106, are collected by the light collecting element 107, and emitted onto the phosphor 122. The phosphor 122 is excited by the light rays having the wavelength A as exciting light so as to emit light having the wavelength C. The light having the wavelength C is incident on the light collecting element 107 functioning as a light collecting unit for light having the wavelength C. The light having the wavelength C is collected by the light collecting element 107, is reflected by the dichroic mirror 106, further transmits through the dichroic mirror 110, and is emitted from the illuminating device 1.

Note that the light collecting element 103 and the light collecting element 107 may be a lens array in which a first lens that collects the incident light rays having the wavelength A on the substrate 120 and irradiates the phosphor 121 with the collected light rays, and a second lens that collects the incident light rays having the wavelength A on the substrate 120 and irradiates the phosphor 122 with the collected light rays are configured integrally.

The light collecting unit (in an example in FIG. 1, the light collecting element 103 and the light collecting element 107) is arranged for each of equal to or more than two phosphors. Therefore, exciting light can be collected on each phosphor efficiently.

Furthermore, in the example of FIG. 1, the light collecting element 103 and the light collecting element 107 have functions of selectively collecting the light having the wavelength B and the light having the wavelength C that are emitted by irradiating the phosphor 121 and the phosphor 122 with the exciting light. Therefore, the light components of different colors that have been emitted by exciting the phosphors 121 and 122 can be taken in by the respective light collecting elements 103 and 107 without being mixed with each other.

The exciting light from the light sources passes through center portions of the light collecting elements and is emitted onto the corresponding phosphors 121 and 122. The light obtained when the phosphors 121 and 122 emit light is diffused. Therefore, in order that the light components of different colors that are emitted from the adjacent phosphors 121 and 122 are not mixed with each other, the light from the phosphors 121 and 122 is required to be collected individually. The light collecting elements can be configured so as to be suitable to light components having different wavelengths by providing the light collecting element for each phosphor. This makes it possible to collect light emitted from each phosphor more efficiently.

As described above, the dichroic mirror 106 transmits light having the wavelength B that has been emitted from the phosphor 121, and has been reflected by the dichroic mirror 102 through the light collecting element 103. In addition, the dichroic mirror 106 reflects light having the wavelength C that has been emitted from the phosphor 122, and has been incident through the light collecting element 107.

In this case, the dichroic mirror 106 is arranged such that the optical path of the light having the wavelength C that has been emitted from the phosphor 122 and has been reflected by the dichroic mirror 106 overlaps with the optical path of the light having the wavelength B that is incident from the dichroic mirror 102 so as to obtain one optical path. This makes it possible to synthesize the light having the wavelength B and the light having the wavelength C. In this manner, the dichroic mirror 106 functions as an optical path controller that introduces the light components emitted from equal to or more than two light collecting elements 103 and 107 to the same optical path.

Next, an optical path of light from the light source 108 is described. Light rays having the wavelength A that have been emitted from the light source 108 are collimated by the coupling lens 109, reflected by the dichroic mirror 110, and emitted from the illuminating device 1.

As described above, the dichroic mirror 110 transmits light having the wavelength B and light having the wavelength C, and reflects light having the wavelength A. Accordingly, the dichroic mirror 110 is arranged such that the optical path of the light having the wavelength A overlaps with the optical path of the light emitted from the dichroic mirror 106 so as to obtain one optical path. Note that on the optical path of the light emitted from the dichroic mirror 106, the optical path of the light having the wavelength B and the optical path of the light having the wavelength C have overlapped with each other. If the dichroic mirrors 106 and 110 are arranged as described above, the light having the wavelength A, the light having the wavelength B, and the light having the wavelength C can be synthesized. In this case, the dichroic mirrors 106 and 110 function as optical path controllers that introduce the light components emitted from equal to or more than two light collecting elements 103 and 107 and the light source 108 to the same optical path.

When the light rays emitted from the light sources 100 and 104 are emitted onto the phosphors 121 and 122 that are formed on the substrate 120 on concentric circles in accordance with the above-described optical paths, the substrate 120 is rotationally driven by the driving unit 123. If the substrate 120 is rotationally driven, the light rays from the light sources 100 and 104 are emitted onto the phosphors 121 and 122, respectively, continuously. At this time, positions onto which the light rays are emitted change temporally. Therefore, the positions of the phosphors 121 and 122 onto which the light rays are emitted are dispersed so as to prevent the phosphors 121 and 122 from being damaged and deteriorated in characteristics. It is to be noted that a rotation speed of the substrate 120 is not particularly limited and needs not be constant.

A method of changing the irradiation positions of the light rays onto the phosphors 121 and 122 temporally is not limited to rotational driving of the substrate 120. That is to say, it is sufficient that the substrate 120 is driven such that the light rays are emitted onto the phosphors 121 and 122 continuously and the irradiation positions are returned at a predetermined cycle. As an example, it is considered that the substrate 120 is vibration-driven vertically with respect to the light ray incident direction.

In this example, optical systems for the light sources 100 and 104 are arranged such that a distance between an irradiation position $P_1$ of the light rays having the wavelength A onto the phosphor 121 and an irradiation position $P_2$ of the light rays having the wavelength A onto the phosphor 122 is the shortest. The optical systems for the light sources 100 and 104 include the coupling lens 101, the dichroic mirrors 102, and the light collecting element 103, and the coupling lens 105, the dichroic mirror 106, and the light collecting element 107 in addition to the light sources 100 and 104.

For example, the optical systems for the light sources 100 and 104 are arranged such that the irradiation position $P_1$ and the irradiation position $P_2$ are aligned along the radius of the substrate 120. With this, the distance between the irradiation position $P_1$ and the irradiation position $P_2$ can be made the shortest. This makes it possible to reduce the size of the optical system.

Application Example of First Embodiment

Figure 3:
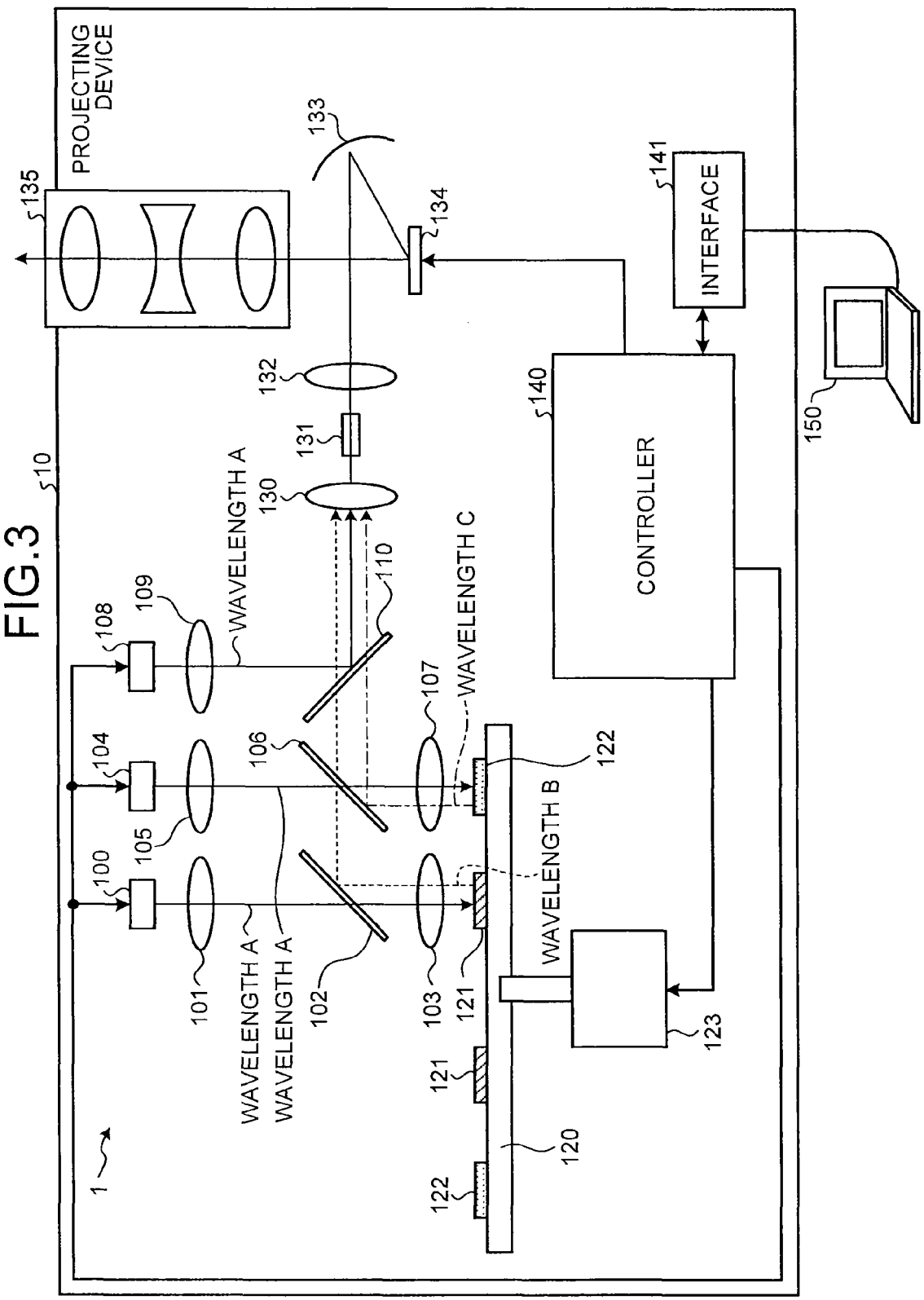
FIG. 3 is a block diagram illustrating an example of a configuration of a projecting device using the illuminating device according to the first embodiment.

FIG. 3 illustrates an example of a configuration of a projecting device 10 using the illuminating device 1 in FIG. 1. In FIG. 3, the same reference numerals denote parts common to those in FIG. 1, and a detailed description thereof is omitted. The projecting device 10 includes the illuminating device 1 that has been described with reference to FIG. 1, a controller 140, an interface 141, and a projection optical system. The projection optical system includes light collecting elements 130 and 132, a mirror 133, an integrator 131, an image generator 134, and a projecting lens 135.

Since each of optical paths of light rays having the wavelength A that have been emitted from the light sources 100, 104, and 108 on the illuminating device 1 to be incorporated into the projecting device 10 is the same as each of the optical paths as described with reference to FIG. 1, description thereof is omitted.

On the projecting device 10, beams of light rays having the wavelengths A, B, and C that have been emitted from the dichroic mirror 110 are collected by the light collecting element 130, are dispersed uniformly by the integrator 131 planarly, and are emitted onto the image generator 134 through the light collecting elements 132 and the mirror 133.

The image generator 134 is a light modulating element that modulates emitted light with a modulation signal based on image data so as to form an image. As the image generator 134, a digital micromirror device (DMD) can be used, for example. The DMD reflects the emitted light after controlling gradation thereof with a driving signal (modulation signal) based on image data for each display pixel. When only one image generator 134 is used, beams of R (red), G (green), and B (blue), that is, light rays having the wavelengths B, C, and A are switched to be emitted sequentially in terms of time in one frame period. In addition, a driving signal based on image data of each color of R, G, and B is generated in synchronization with an irradiation timing of each color of R, G, and B so as to drive the image generator 134. With this, a full color image in accordance with the image data can be obtained by using an afterimage phenomenon on eyes.

The beam of each color of R, G, and B of which gradation has been controlled by the image generator 134 for each display pixel is emitted to the outside of the projecting device 10 through the projection lens 135. Then, the beam is projected onto a display medium (not illustrated) such as a screen so that an enlarged image is displayed.

The controller 140 has a central processing unit (CPU), a read only memory (ROM), and a random access memory (RAM), for example. The controller 140 controls the entire operations of the projecting device 10 by using the RAM as a work memory in accordance with programs that have been previously stored in the ROM. The interface 141 performs communication with an external information apparatus such as a personal computer 150. For example, the controller 140 loads image data output from the personal computer 150 through the interface 141.

The controller 140 performs image processing on image data loaded through the interface 141 so as to generate appropriate image data for driving the image generator 134. The generated image data is supplied to a driving signal generator (not illustrated), for example. The driving signal generator generates a driving signal based on the supplied image data so as to drive the image generator 134. The controller 140 controls the light sources 100, 104, and 108 based on the image data loaded through the interface 141. The controller 140 can perform rotation control of the driving unit 123 on the phosphor wheel unit 111.

Figure 4:
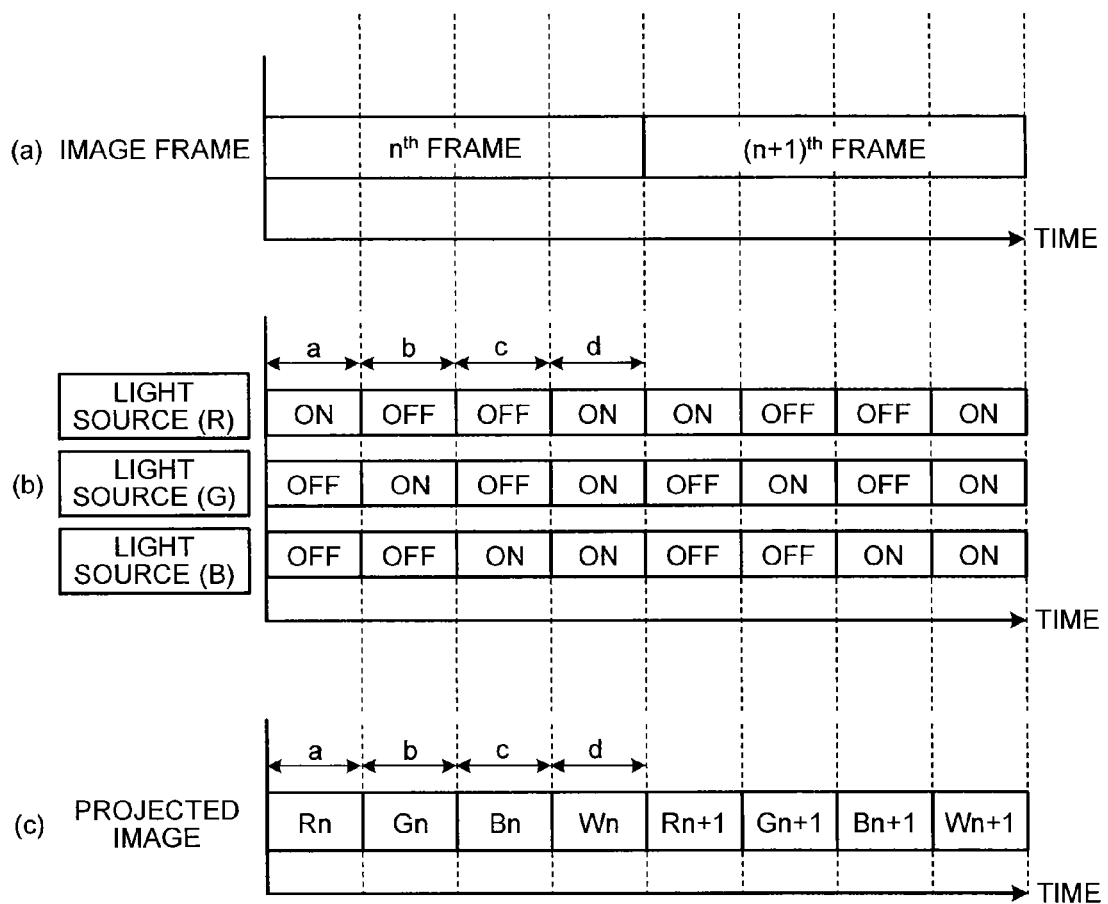
FIG. 4 is a schematic view illustrating an example of light source control according to the first embodiment.

FIG. 4 illustrates an example of light source control according to the first embodiment. FIG. 4(a) illustrates an example of an image frame. As an example, a frame frequency is assumed to be 60 Hz, and a length of one frame is assumed to be 1/60 sec.

FIG. 4(b) illustrates an example of lighting control of the light sources 100, 104, and 108. A light source (R) is a light source for emitting light rays of R (red) and corresponds to the light source 100 in the example of FIG. 1. A light source (G) is a light source for emitting light rays of G (green) and corresponds to the light source 104 in the example of FIG. 1. A light source (B) is a light source for emitting light rays of B (blue) and corresponds to the light source 108 in the example of FIG. 1.

In the first embodiment, one frame period is divided into four periods a, b, c, and d and lighting control of each of the light sources 100, 104, and 108 is performed in each of the periods a, b, c, and d. In the example of FIG. 4(b), in the period a, the light source (R) is lightened up (ON), and others of the light source (G) and the light source (B) are lightened out (OFF). In the period b, the light source (G) is lightened up (ON), and others of the light source (R) and the light source (B) are lightened out (OFF). In the subsequent period c, the light source (B) is lightened up (ON), and others of the light source (R) and the light source (G) are lightened out (OFF).

Furthermore, in the subsequent period d, all of the light sources (R), (G), and (B) are lightened up. The control is repeated every frame.

FIG. 4(c) illustrates a projected image based on the lighting control as illustrated in FIG. 4(b). For example, in a $n^{th}$ frame, in the period a, since only the light source (R) is lightened up, an image Rn of the color of R is projected. In the period b, since only the light source (G) is lightened up, an image Gn of the color of G is projected. In the period c, since only the light source (B) is lightened up, an image Bn of the color of B is projected. Driving of the image generator 134 is controlled in synchronization with the lighting period of each of the light sources (R), (G), and (B). In this manner, the images Rn, Gn, and Bn of the colors of R, G, and B are projected sequentially in terms of time in one frame period. With this, a full color projected image can be obtained with an afterimage effect.

Furthermore, a period d in which all of the light source (R), the light source (G), and the light source (B) are lightened up at the same time can be provided. This makes it possible to obtain a whit image Wn with no afterimage effect. If the white image Wn is projected in one frame period, a contrast of the projected image can be improved. For example, on a projected image of which ground color is white or a projected image on which white text is displayed on the ground of a deep color, visibility is expected to be improved by projecting the white image Wn together with the images Rn, Gn, and Bn of the colors of R, G, and B in one frame period.

Furthermore, in the first embodiment, the light source 100, the light source 104, and the light source 108 are provided independently for the colors of R, G, and B, respectively. Therefore, each of the emission periods a, b, c, and d of the colors of R, G, and B and white can be changed. With this, the color can be changed by adjusting the emission periods a, b, and c of the colors of R, G, and B. For example, if a percentage of the period a in one frame period is increased, red can be intensified on a projected image. In addition, a color temperature can be also changed by adjusting the emission periods a, b, and c of the colors of R, G, and B appropriately, for example.

The case where the light sources (R), (G), and (B) are lightened up independently and the case where all of the light sources (R), (G), and (B) are lightened up at the same time have been described. However, the invention is not limited to the examples. For example, two light sources such as the light sources (R) and (B), the light sources (R) and (G), or the light source (G) and (B) can be also controlled to be lightened up at the same time.

As described above, in the first embodiment, a plurality of phosphors 121 and 122 that emit light components of different colors are formed on one substrate 120 on the phosphor wheel unit 111. Therefore, it is sufficient that the projecting device 10 has only one phosphor wheel unit 111, thereby reducing the size and cost of the device.

Furthermore, the phosphors 121 and 122 that emit light components of different colors are arranged to be adjacent to each other. Therefore, the dichroic mirror 102 that reflects light from the phosphor 121 and the dichroic mirror 106 that reflects light from the phosphor 122 can be arranged to be closer to each other. This makes it possible to realize synthesis of the light having the wavelength B from the phosphor 121 and the light having the wavelength C from the phosphor 122 by the dichroic mirror 106 with a more compact configuration.

In addition, the light sources 100 and 104 are used for exciting the phosphors 121 and 122, respectively. Therefore, each of the light having the wavelength B from the phosphor 121 and the light having the wavelength C from the phosphor 122 can be taken out independently at a different time and can be taken at the same time so as to be mixed with each other by separately controlling driving of the light sources 100 and 104.

First Variation of First Embodiment

Figure 5:
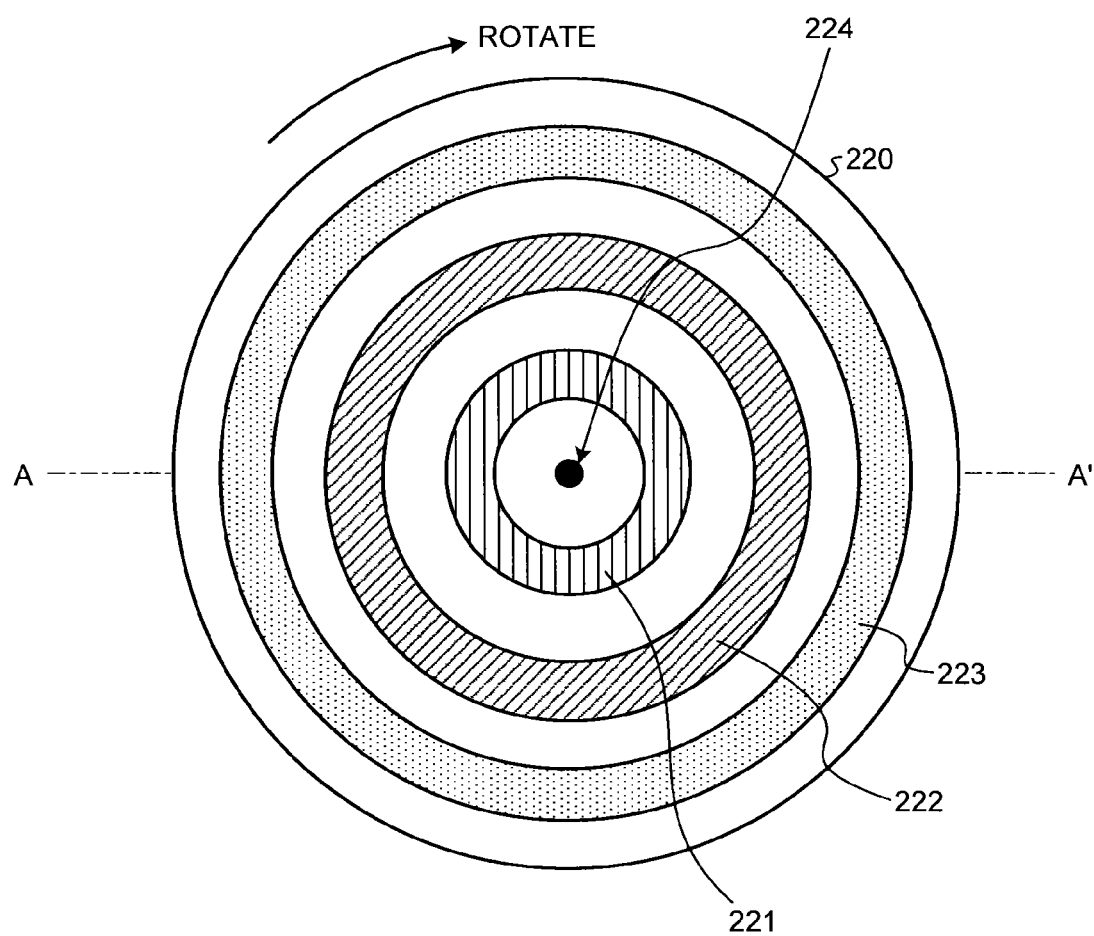
FIG. 5 is a schematic view illustrating a substrate according to a first variation of the first embodiment when seen from a surface on which phosphors are formed.

Next, the first variation of the first embodiment is described. The first variation of the first embodiment is an example in which phosphors 221, 222, and 223 of colors of B, R, and G are formed on one substrate 220 formed by a reflecting member, as illustrated in FIG. 5. That is to say, the phosphors 221, 222, and 223 are formed on the substrate 220 on concentric circles so as to have predetermined widths. The center of the concentric circles is set to a rotation center 224, and the substrate 220 is rotationally driven about the rotation center 224 by the driving unit 123.

The phosphor 221 is excited by ultraviolet light as light having a wavelength of ultraviolet rays, for example, so as to emit light having a wavelength A of blue. The phosphor 222 is excited by ultraviolet light so as to emit light having a wavelength B of red, for example. The phosphor 223 is excited by ultraviolet light so as to emit light having a wavelength C of green, for example.

Note that in this example, it is also preferable that the phosphor 223 that emits light of green be arranged at the outer side with respect to phosphors that emit light components of other colors as in the above-described first embodiment.

Figure 6:
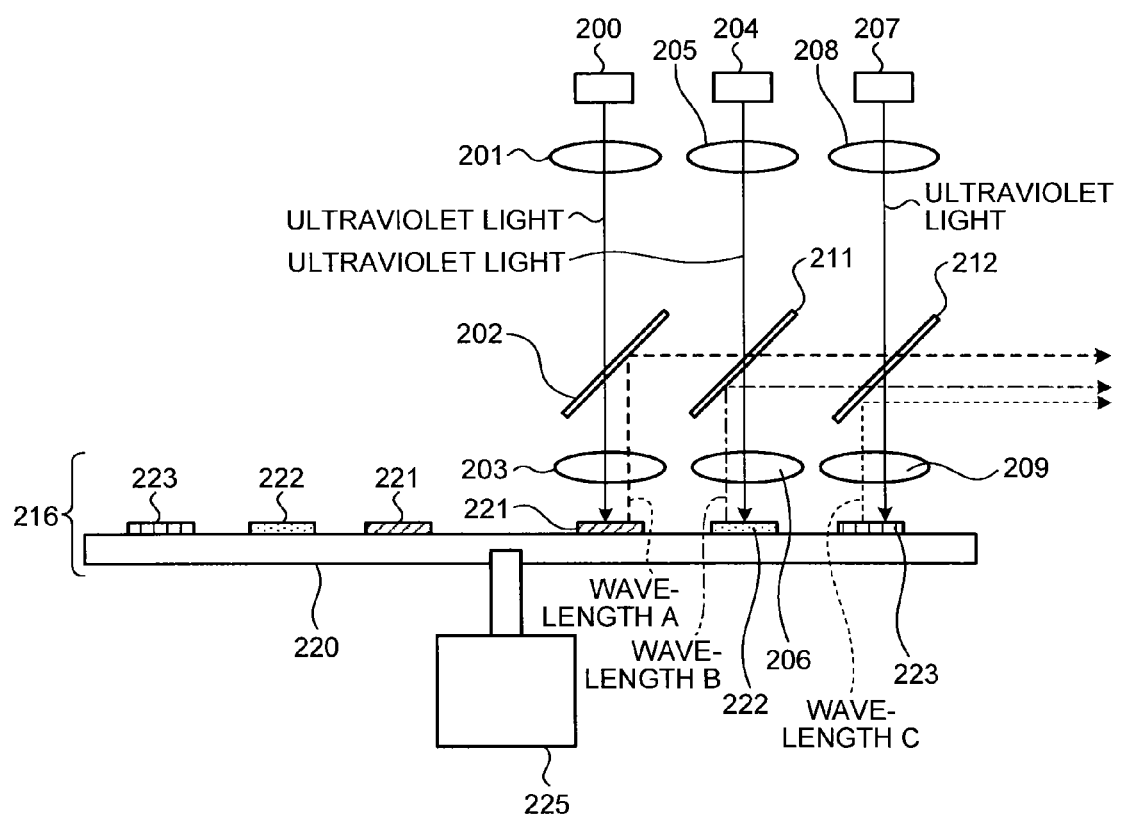
FIG. 6 is a schematic view illustrating an example of configuration of an illuminating device according to the first variation of the first embodiment.

FIG. 6 illustrates an example of a configuration of an illuminating device 2 according to the first variation of the first embodiment. The illuminating device 2 includes light sources 200, 204, and 207, coupling lenses 201, 205, and 208, dichroic mirrors 202, 211, and 212, and a phosphor wheel unit 216. As described above with reference to FIG. 5, the phosphor wheel unit 216 includes the substrate 220, the phosphors 221, 222, and 223, a driving unit 225, and light collecting elements 203, 206, and 209. The driving unit 225 rotationally drives the substrate 220 about the rotation center 224 of the substrate 220.

Note that the substrate 220 in FIG. 6 corresponds to a cross section thereof cut along line A-A' of the substrate 220 in FIG. 5.

In FIG. 6, the light sources 200, 204, and 207 are light emitting elements that emit light rays having wavelengths (equal to or lower than 400 nm) in a ultraviolet region, for example. Ultraviolet laser diodes can be used as the light sources 200, 204, and 207, for example. The dichroic mirror 202 is configured to reflect light having the wavelength A of blue and transmit light components having the wavelength B and the wavelength C. The dichroic mirror 211 is configured to reflect light having the wavelength B of red and transmit light components having the wavelength A and the wavelength C. The dichroic mirror 212 is configured to reflect light having the wavelength C of green and transmit light components having the wavelength A and the wavelength B.

Each of the light collecting elements 203, 206, and 209 is configured so as to transmit light having a predetermined wavelength selectively. In this example, the light collecting element 203 can transmit light having the wavelength of ultraviolet rays that is incident from the side of the light source 200, and transmit light having the wavelength A that is incident from the side of the phosphor 221. The light collecting element 206 can transmit light having the wavelength of ultraviolet rays that is incident from the side of the light source 204, and transmit light having the wavelength B that is incident from the side of the phosphor 222. The light collecting element 209 can transmit light having the wavelength of ultraviolet rays that is incident from the side of the light source 207, and transmit light having the wavelength C that is incident from the side of the phosphor 223.

Note that the light collecting elements 203, 206, and 209 may be a lens array in which a first lens that collects the incident light rays having the wavelength of ultraviolet rays on the substrate 220 and irradiates the phosphor 221 with the collected light rays, a second lens that collects the incident light rays having the wavelength of ultraviolet rays on the substrate 220 and irradiates the phosphor 222 with the collected light rays, and a third lens that collects the incident light rays having the wavelength of ultraviolet rays on the substrate 220 and irradiates the phosphor 223 with the collected light rays are configured integrally.

Optical paths on the illuminating device 2 are described with reference to FIG. 6. First, an optical path of light from the light source 200 is described. Ultraviolet light that has been emitted from the light source 200 is collimated by the coupling lens 201, transmits through the dichroic mirror 202, and is incident on the light collecting element 203. The light collecting element 203 collects the incident ultraviolet light on the substrate 220, and irradiates the phosphor 221 with the collected ultraviolet light. The phosphor 221 is excited by light rays of the ultraviolet light so as to emit light having the wavelength A of blue. The light having the wavelength A is collected by the light collecting element 203 selectively so as to be emitted to the dichroic mirror 202. The light rays having the wavelength A that have been emitted from the light collecting element 203 are reflected by the dichroic mirror 202, and are emitted from the illuminating device 2 through the dichroic mirrors 211 and 212.

Next, an optical path of light from the light source 204 is described. Ultraviolet light that has been emitted from the light source 204 is collimated by the coupling lens 205, transmits through the dichroic mirror 211, and is emitted onto the phosphor 222 through the light collecting element 206. The phosphor 222 is excited by the ultraviolet light so as to emit light having the wavelength B of red. The light having the wavelength B is collected by the light collecting element 206 selectively, and is emitted to the dichroic mirror 211. The light having the wavelength B that has been emitted from the light collecting element 206 transmits through the dichroic mirror 212, and is emitted from the illuminating device 2.

The dichroic mirror 211 is arranged such that the optical path of the light having the wavelength B that has been emitted from the phosphor 222 and has been reflected by the dichroic mirror 211 overlaps with the optical path of the light having the wavelength A that is incident from the dichroic mirror 202 so as to obtain one optical path. This makes it possible to synthesize the light having the wavelength A and the light having the wavelength B. In this manner, the dichroic mirror 211 functions as an optical path controller that introduces the light components emitted from equal to or more than two light collecting elements 203 and 206 to the same optical path.

Next, an optical path of light from the light source 207 is described. Ultraviolet light that has been emitted from the light source 207 is collimated by the coupling lens 208, transmits through the dichroic mirror 212, and is emitted onto the phosphor 223 through the light collecting element 209. The phosphor 223 is excited by the ultraviolet light so as to emit light having the wavelength C of green. The light having the wavelength C is collected by the light collecting element 209 selectively, and is emitted to the dichroic mirror 212. The light having the wavelength C that has been emitted from the light collecting element 209 is reflected by the dichroic mirror 212, and is emitted from the illuminating device 2.

The dichroic mirror 212 transmits the light components having the wavelength A and the wavelength B and reflects the light having the wavelength C. Accordingly, the dichroic mirror 212 is arranged such that the optical path of the light having the wavelength C overlaps with the optical path of the light emitted from the dichroic mirror 211 so as to obtain one optical path. Note that on the optical path of the light emitted from the dichroic mirror 211, the optical path of the light having the wavelength A and the optical path of the light having the wavelength B have overlapped with each other. With this, the light having the wavelength A, the light having the wavelength B, and the light having the wavelength C can be synthesized. In this case, the dichroic mirrors 211 and 212 function as optical path controllers that introduce the light components emitted from equal to or more than two light collecting elements 203, 206, and 209 to the same optical path.

As described above, in the first variation of the first embodiment, the phosphors 221, 222, and 223 that emit light components of the colors of R, G, and B are provided on the substrate 220 so that the optical path for the colors of R, G, and B can be made common to one another. This makes it possible to reduce the cost and size of the device easily.

Furthermore, the light collecting elements 203, 206, and 209 are arranged for three phosphors 221, 222, and 223, respectively. Therefore, the light collecting elements 203, 206, and 209 can be configured to be suitable to the different wavelengths A, B, and C, respectively. Accordingly, exciting light that is emitted from the phosphors 221, 222, and 223 can be collected efficiently.

When the ultraviolet light emitted from the light sources 200, 204, and 207 is emitted onto the phosphors 221, 222, and 223, respectively, that are formed on the substrate 220 on concentric circles, in accordance with the above-described optical paths, the substrate 220 is rotationally driven by the driving unit 225. If the substrate 220 is rotationally driven, the ultraviolet light from the light sources 200, 204, and 207 is emitted onto the phosphors 221, 222, and 223, respectively, continuously. At this time, positions onto which the light rays are emitted change temporally. Therefore, the positions of the phosphors 221, 222, and 223 onto which the ultraviolet light is emitted are dispersed so as to prevent the phosphors 221, 222, and 223 from being damaged and deteriorated in characteristics. It is to be noted that a rotation speed of the substrate 220 is not particularly limited and needs not be constant.

A method of changing the irradiation positions of the light rays onto the phosphors 221, 222, and 223 temporally is not limited to rotational driving of the substrate 220. That is to say, it is sufficient that the substrate 220 is driven such that the light rays are emitted onto the phosphors 221, 222, and 223 continuously and the irradiation positions are returned at a predetermined cycle. As an example, it is considered that the substrate 220 is vibration-driven vertically with respect to the light ray incident direction.

The illuminating device 2 according to the first variation of the first embodiment can be used by being incorporated into the projecting device 10 in the same manner as the illuminating device 1 according to the first embodiment, and can be controlled in the same manner. Therefore, a detailed description thereof is omitted. Furthermore, a relationship between control for obtaining emitted light components of the colors of R, G, and B and an image frame is also the same as the control as described with reference to FIG. 4.

Second Variation of First Embodiment

In the above-described first embodiment, optical systems for the light sources 100 and 104 are configured such that a distance between the irradiation positions of the light rays onto the phosphors 121 and 122 of colors on the substrate 120 is the shortest. In contrast, in the second variation of the first embodiment, optical systems for the light sources 100 and 104 are configured such that the distance is longer.

Figure 7:
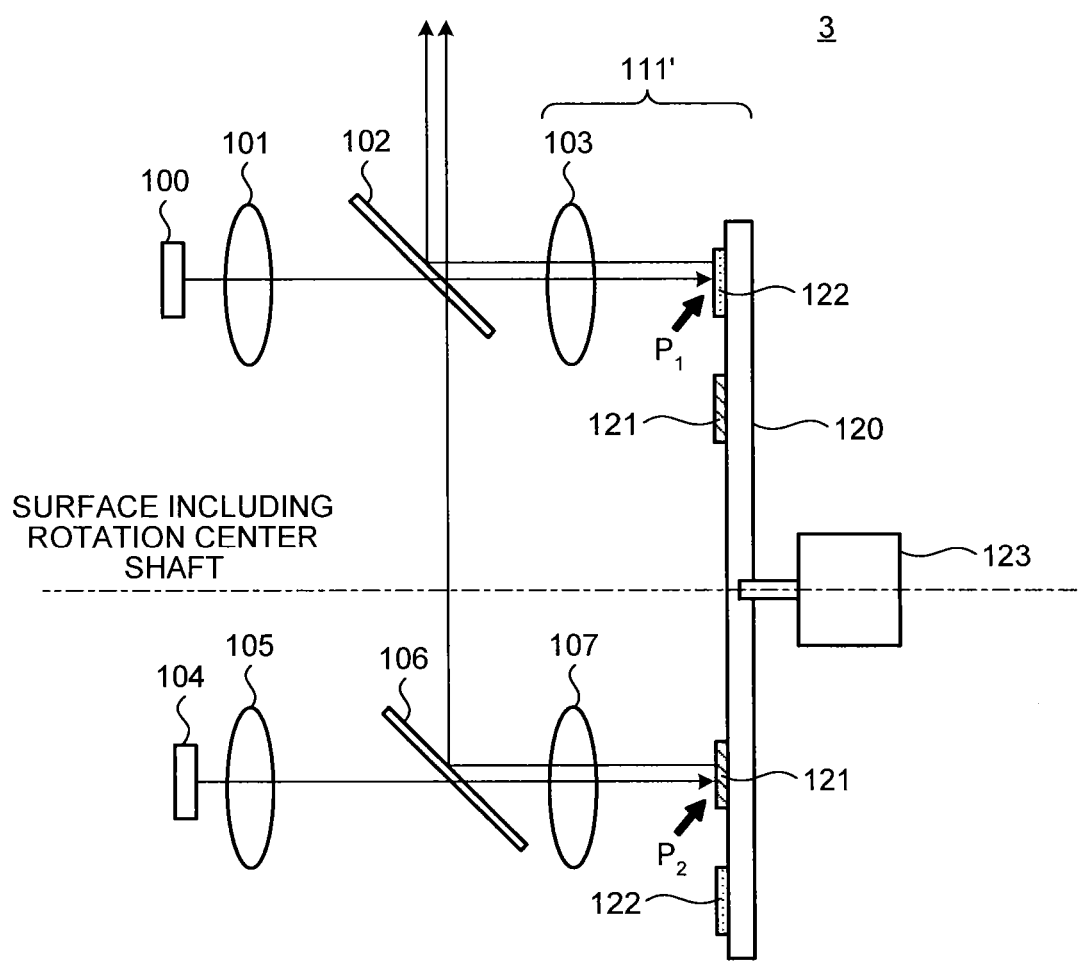
FIG. 7 is a schematic view illustrating an example of a configuration of an illuminating device according to a second variation of the first embodiment.

FIG. 7 illustrates an example of a configuration of an illuminating device 3 according to the second variation of the first embodiment. In FIG. 7, the same reference numerals denote parts common to those in FIG. 1, and a detailed description thereof is omitted. It is to be noted that in the second variation of the first embodiment, a configuration of the substrate 120 to be used in a phosphor wheel unit 111' is the same as that as described in the first embodiment with reference to FIG. 2.

As illustrated in FIG. 7, in the second variation of the first embodiment, the optical systems for the light sources 100 and 104 are arranged such that an irradiation position $P_1$ of light rays onto the phosphor 122 and an irradiation position $P_2$ of light rays onto the phosphor 121 on the substrate 120 sandwich a surface including the axis of the rotation center 124 of the substrate 120. Since the positional relationship between the irradiation position $P_1$ and the irradiation position $P_2$ is realized in this manner, a distance between the irradiation position $P_1$ and the irradiation position $P_2$ becomes longer beyond the shortest distance.

Furthermore, the irradiation position $P_1$ and the irradiation position $P_2$ are arranged on the diameter of the substrate 120 so as to sandwich the rotation center 124. With this, the distance between the irradiation position $P_1$ and the irradiation position $P_2$ can be made maximum. It is to be noted that the irradiation position $P_1$ and the irradiation position $P_2$ may not necessarily sandwich the surface including the axis of the rotation center 124.

Figure 8:
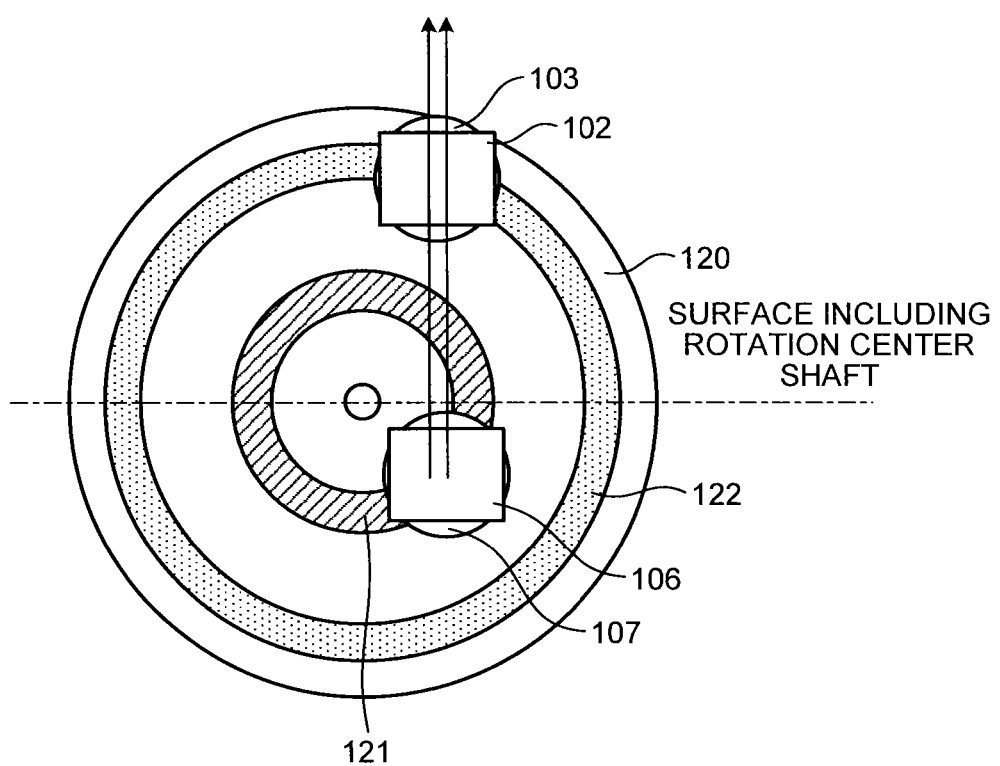
FIG. 8 is a schematic view illustrating a substrate according to the second variation of the first embodiment when seen from a surface on which phosphors are formed.

FIG. 8 is a view illustrating the substrate 120 when seen from the surface on which the phosphors 121 and 122 are formed. In this example, the optical system for the light source 100 including the light collecting element 103 and the dichroic mirror 102 and the optical system for the light source 104 including the light collecting element 107 and the dichroic mirror 106 are arranged so as to sandwich the axis of the rotation center 124.

A light ray conversion ratio on the phosphor is not 100%. Therefore, when light rays having a wavelength are emitted onto the phosphor so as to be converted to light rays having another wavelength, energy loss occurs and a part of the loss becomes heat. Accordingly, it is considered that an irradiation position of the light rays onto the phosphor generates heat so that the characteristics of the phosphor are deteriorated or a conversion ratio is further lowered. Then, as in the second variation of the first embodiment, if a plurality of irradiation positions are set to be positions distanced from one another, heats generated by the irradiation of the light rays are dissipated, thereby emitting light stably.

Furthermore, if the optical systems for the light source 100 and the light source 104 are distanced from each other, the degree of freedom of diameters of the light collecting elements 103 and 107 is improved. Therefore, light ray collecting characteristics and intake ability of light emitted for the phosphors 121 and 122 of the light collecting elements 103 and 107 can be enhanced.

The illuminating device 3 according to the second variation of the first embodiment can be used by being incorporated into the projecting device 10 in the same manner as the illuminating device 1 according to the first embodiment, and can be controlled in the same manner. Therefore, a detailed description thereof is omitted. Furthermore, a relationship between control for obtaining emitted light components of the colors of R, G, and B and an image frame is also the same as the control as described with reference to FIG. 4.

Furthermore, in the second variation of the first embodiment, the light collecting elements 103 and 107 may also selectively collect light components having the wavelengths that are emitted from the phosphors 122 and 121, respectively, for light that is incident from the sides of the phosphors 122 and 121. With this, for example, even if the substrate 120 is designed so as to have a smaller diameter, light emitted from the phosphors 122 and 121 is prevented from being mixed with each other.

Third Variation of First Embodiment

Next, the third variation of the first embodiment is described. In the above-described first embodiment, the light sources 108, 100, and 104 are provided for the wavelength A, the wavelength B, and the wavelength C, respectively. In contrast, in the third variation of the first embodiment, a light source is shared by two wavelengths among three of the wavelength A, the wavelength B, and the wavelength C and light components having the wavelength A, the wavelength B, and the wavelength C can be obtained by two light sources.

Figure 9:
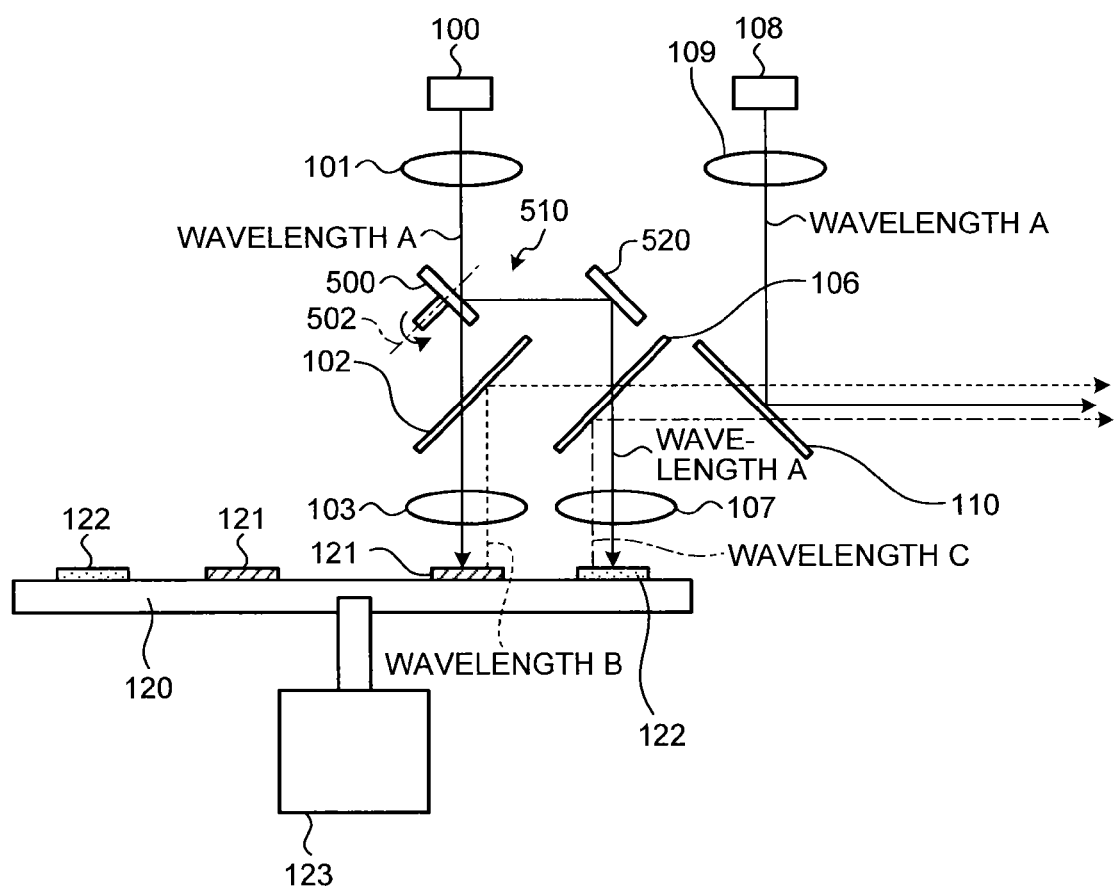
FIG. 9 is a schematic view illustrating an example of a configuration of an illuminating device according to a third variation of the first embodiment.

FIG. 9 illustrates an example of a configuration of an illuminating device 7 according to the third variation of the first embodiment. In FIG. 9, the same reference numerals denote parts common to those in FIG. 1, and a detailed description thereof is omitted. On the illuminating device 7 as illustrated in FIG. 9, the light source 104 in the illuminating device 1 as illustrated in FIG. 1 is not provided and an optical path switching unit 510 and a mirror 520 are added.

The optical path switching unit 510 is arranged between the light source 100 and the phosphor 121, for example. The optical path switching unit 510 switches an optical path of light from the light source 100 between a first optical path on which the light is emitted onto the phosphor 121 and a second optical path on which the light is emitted onto the phosphor 122.

Figure 10:
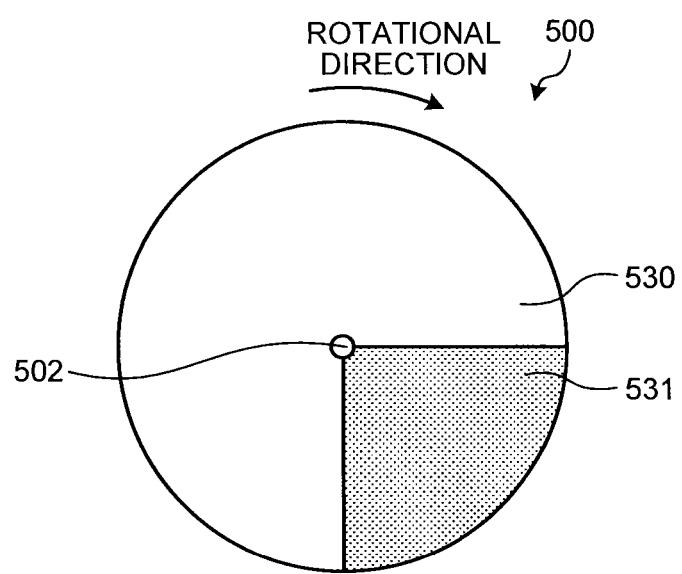
FIG. 10 is a schematic view illustrating an example of a configuration of a reflecting/transmitting wheel that is applied in the third variation of the first embodiment.

In the third variation of the first embodiment, as the optical path switching unit 510, a reflecting/transmitting wheel 500 that rotates about a rotating axis 502 is used as illustrated in FIG. 10. One region of the reflecting/transmitting wheel 500 when radially divided is a transmission region 530 through which light transmits. The other region of the reflecting/transmitting wheel 500 is a reflection region 531 that reflects light. The reflecting/transmitting wheel 500 is arranged on an optical path of light rays at a predetermined angle and is rotated in synchronization with image data of each color, thereby selecting an optical path of light rays for each color.

In FIG. 10, on the reflecting/transmitting wheel 500, the reflection region 531 is formed in an angle range of approximately 45° with respect to the rotating axis 502. However, this is an example for explanation and the angle range is not limited to the example.

The reflecting/transmitting wheel 500 is rotated about the rotating axis 502 by a driving unit (not illustrated). In the example of FIG. 9, the reflecting/transmitting wheel 500 is provided on an optical path of light rays having the wavelength A that have been emitted from the light source 100. When the transmission region 530 is located on the optical path, the reflecting/transmitting wheel 500 transmits the light rays. On the other hand, when the reflection region 531 is located on the optical path, the reflecting/transmitting wheel 500 reflects the light rays at a reflection angle in accordance with an angle of the reflecting/transmitting wheel 500. That is to say, since the reflecting/transmitting wheel 500 is provided on the optical path of light rays having the wavelength A, the optical path of light rays having the wavelength A can be switched in accordance with a rotation speed of the reflecting/ transmitting wheel 500, and ratios of the transmission region 530 and the reflection region 531.

In the example of FIG. 9, light having the wavelength A that has been emitted from the light source 100 and has transmitted through the transmission region 530 is emitted onto the phosphor 121 through the dichroic mirror 102 and the light collecting element 103. The phosphor 121 is excited by the light having the wavelength A that has transmitted through the transmission region 530 and has been emitted thereonto so as to emit the light having the wavelength B. The light having the wavelength B that has been emitted from the phosphor 121 is reflected by the dichroic mirror 102, transmits through the dichroic mirrors 106 and 110, and is emitted to the outside.

On the other hand, the light having the wavelength A that has been emitted from the light source 100 and has been reflected by the reflection region 531 is further reflected by the mirror 520, and is emitted onto the phosphor 122 through the dichroic mirror 106 and the light collecting element 107. The phosphor 122 is excited by the light having the wavelength A that has been reflected by the reflection region 531 and has been emitted thereonto so as to emit light having the wavelength C. The light having the wavelength C that has been emitted from the phosphor 122 is reflected by the dichroic mirror 106, transmits through the dichroic mirror 110, and is emitted to the outside.

The dichroic mirror 106 is arranged such that the optical path of the light having the wavelength C that has been emitted from the phosphor 122 and has been reflected by the dichroic mirror 106 overlaps with the optical path of the light having the wavelength B that is incident from the dichroic mirror 102 so as to obtain one optical path. This makes it possible to synthesize the light having the wavelength B and the light having the wavelength C. In this manner, in the third variation of the first embodiment, the dichroic mirror 106 also functions as an optical path controller that introduces the light components emitted from equal to or more than two light collecting elements 103 and 107 to the same optical path.

The light having the wavelength A that has been emitted from the light source 108 is reflected by the dichroic mirror 110 through the coupling lens 109, and is emitted from the illuminating device 7. The dichroic mirror 110 transmits the light components having the wavelength B and the wavelength C, and reflects the light having the wavelength A. Accordingly, the dichroic mirror 110 is arranged such that the optical path of the light having the wavelength A overlaps with the optical path of the light emitted from the dichroic mirror 106 so as to obtain one optical path. Note that on the optical path of the light emitted from the dichroic mirror 106, the optical path of the light having the wavelength B and the optical path of the light having the wavelength C have overlapped with each other. With this, the light having the wavelength A, the light having the wavelength B, and the light having the wavelength C can be synthesized. In this case, the dichroic mirrors 106 and 110 function as optical path controllers that introduce the light components emitted from equal to or more than two light collecting elements 103 and 107 to the same optical path.

The illuminating device 7 according to the third variation of the first embodiment can be used by being incorporated into the projecting device 10 in the same manner as the illuminating device 1 according to the first embodiment, and can be controlled in the same manner. Therefore, a detailed description thereof is omitted.

Furthermore, a relationship between control for obtaining emitted light components of the colors of R, G, and B and an image frame is also substantially the same as the control as described with reference to FIG. 4. In the configuration as illustrated in FIG. 9, the optical path of light from the light source 100 is switched between the first optical path on which the light is introduced to the phosphor 121 and the second optical path on which the light is introduced to the phosphor 122. Therefore, light components having the wavelength A, the wavelength B, and the wavelength C cannot be emitted at the same time. However, lighting in the periods a, b, and c as illustrated in FIG. 4 can be realized by controlling rotation of the reflecting/transmitting wheel 500 and lighting of the light sources 100 and 108 in a predetermined manner, thereby obtaining a full color projected image.

A rotation speed of the reflecting/transmitting wheel 500, and ratios of the transmission region 530 and the reflection region 531 can be set appropriately in accordance with light conversion efficiency when light is emitted from the phosphors 121 and 122.

It is to be noted that although the reflecting/transmitting wheel 500 is used as the optical path switching unit 510, the optical path switching unit 510 is not limited to the example. For example, a liquid crystal polarizing element that controls change of light by using characteristics of liquid crystal and a polarization beam splitter that switches transmission and reflection of light rays with a polarization direction may be combined to be used as the optical path switching unit 510.

Fourth Variation of First Embodiment

Next, the fourth variation of the first embodiment is described. In the above-described first embodiment, as an image forming unit that forms an image based on image data, a single light modulating element is used and is driven in accordance with image data of each color so as to form a full color image. In contrast, in the fourth variation of the first embodiment, a plurality of image forming units corresponding to colors are provided, and images of the colors that have been formed by the image forming units are synthesized to form one full color image.

In the above-described of the first embodiment, the dichroic mirror 106 is used as the optical path controller that introduces equal to or more than two light components to the same optical path, for example. In contrast, in the fourth variation of the first embodiment, a photosynthesis prism such as a cross prism is used as the optical path controller that introduces equal to or more than two light components to the same optical path.

Figure 11:
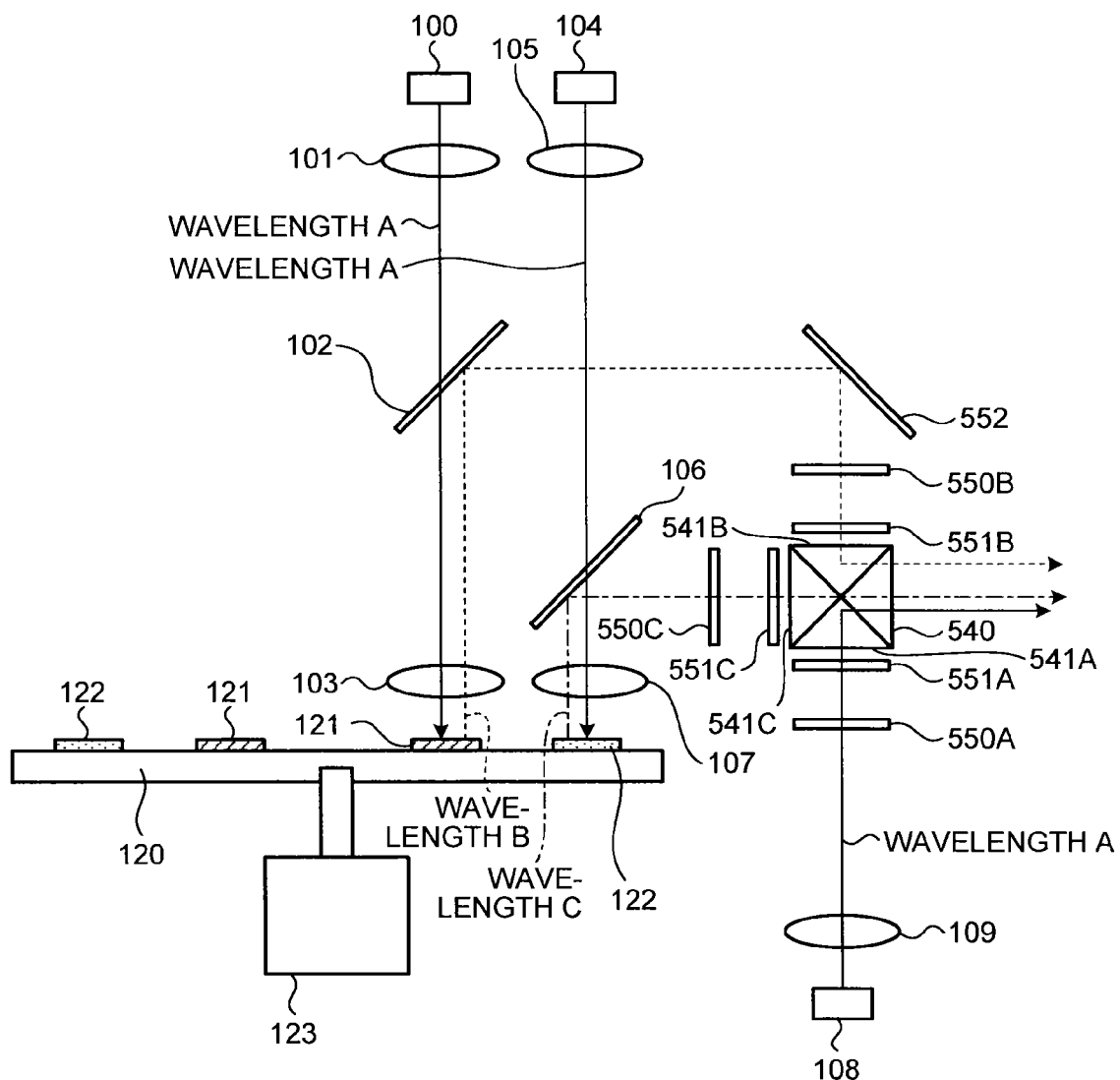
FIG. 11 is a schematic view illustrating an example of a configuration of an illuminating device according to a fourth variation of the first embodiment.

FIG. 11 illustrates an example of a configuration of an illuminating device 8 according to the fourth variation of the first embodiment. In FIG. 11, the same reference numerals denote parts common to those in FIG. 1, and a detailed description thereof is omitted.

In the illuminating device 8 as illustrated in FIG. 11, light components having the wavelength A, the wavelength B, and the wavelength C are introduced to the same optical path by using a photosynthesis prism 540. Furthermore, in the example of FIG. 11, the light components having the wavelength A, the wavelength B, and the wavelength C are modulated by using polarization plates 550A, 550B, and 550C, and transmission-type liquid crystal panels 551A, 551B, and 551C, respectively.

The photosynthesis prism 540 is configured by bonding a plurality of triangular prisms to one another, for example. Light that has been incident on surfaces 541A, 541B, and 541C is emitted on the same optical path from a surface 541D.

In FIG. 11, the light having the wavelength A that has been emitted from the light source 100 is emitted onto the phosphor 121 through the dichroic mirror 102 and the light collecting element 103. The phosphor 121 is excited by the light having the wavelength A so as to emit light having the wavelength B.

Then, the light having the wavelength B is incident on and is reflected by the dichroic mirror 102 through the light collecting element 103. The light having the wavelength B that has been reflected by the dichroic mirror 102 is reflected by a folding mirror 552 so as to be incident on the polarization plate 550B. The light having the wavelength B is polarized by the polarization plate 550B, is incident on the liquid crystal panel 551B driven based on image data corresponding to color of the wavelength B to be modulated in accordance with the image data, and is incident on the surface 541B of the photosynthesis prism 540.

The light having the wavelength A that has been emitted from the light source 104 is emitted onto the phosphor 122 through the dichroic mirror 106 and the light collecting element 107. The phosphor 122 is excited by the light having the wavelength A so as to emit light having the wavelength C. Then, the light having the wavelength C is incident on and is reflected by the dichroic mirror 106 through the light collecting element 107. The light having the wavelength C that has been reflected by the dichroic mirror 106 is polarized by the polarization plate 550C, is incident on the liquid crystal panel 551C driven based on image data corresponding to color of the wavelength C to be modulated in accordance with the image data, and is incident on the surface 541C of the photosynthesis prism 540.

The light having the wavelength A that has been emitted from the light source 108 is polarized by the polarization plate 550A, is incident on the liquid crystal panel 551A driven based on image data corresponding to color of the wavelength A to be modulated in accordance with the image data, and is incident on the surface 541A of the photosynthesis prism 540. It is to be noted that when a semiconductor laser such as a laser diode is used as the light source 108, light that is emitted from the light source 108 has been polarized in some case. In this case, the polarization plate 550A can be omitted.

The light components having the wavelength A, the wavelength B, and the wavelength C that have been incident on the surface 541A, 541B, and 541C, respectively, of the photosynthesis prism 540 are synthesized on the photosynthesis prism 540 to form a full color image, and then, are emitted to the outside on one optical path.

The illuminating device 8 according to the fourth variation of the first embodiment can be used by being incorporated into the projecting device 10 in the same manner as the illuminating device 1 according to the first embodiment, and can be controlled in the same manner. Therefore, a detailed description thereof is omitted. Furthermore, a relationship between control for obtaining emitted light components of the colors of R, G, and B and an image frame is also substantially the same as the control as described with reference to FIG. 4. Therefore, a detailed description thereof is also omitted.

Furthermore, it can be also considered that a polarization conversion unit is arranged between light sources or phosphors and liquid crystal panels. In this case, illumination efficiency can be further improved with the polarization conversion unit.

Fifth Variation of First Embodiment

Next, the fifth variation of the first embodiment is described. In the above-described first embodiment, a DMD is used as a light modulating element that forms an image in accordance with a modulation signal based on image data. In contrast, in the fifth variation of the first embodiment, a reflection-type liquid crystal panel is used as the light modulating element. In the reflection-type liquid crystal panel, a liquid crystal driving circuit is formed on a silicon substrate and liquid crystal is sandwiched between the silicon substrate and a transparent substrate opposed to the silicon substrate.

Figure 12:
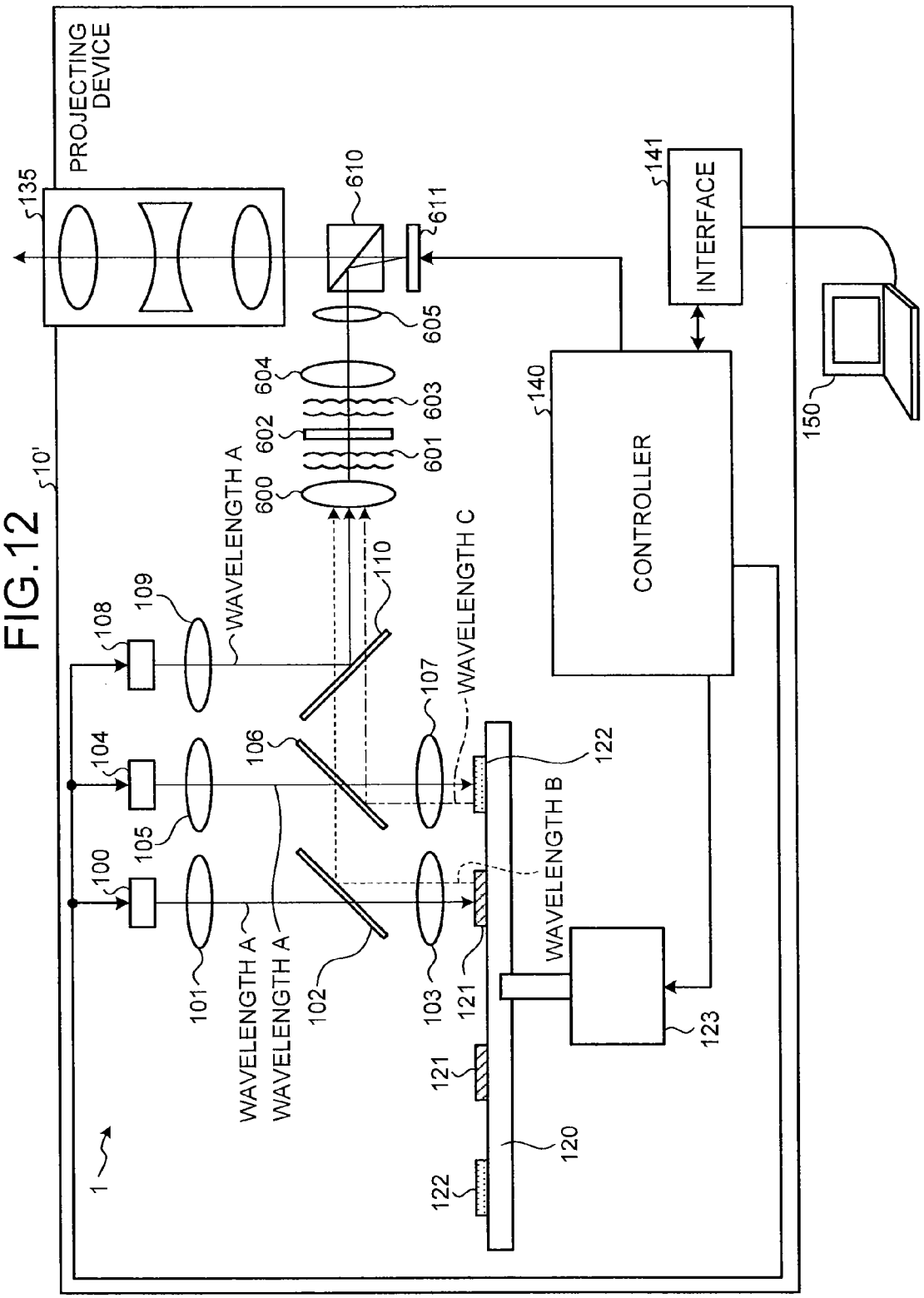
FIG. 12 is a block diagram illustrating an example of a configuration of a projecting device according to a fifth variation of the first embodiment.

FIG. 12 illustrates an example of a configuration of a projecting device 10' according to the fifth variation of the first embodiment. The illuminating device 1 as described with reference to FIG. 1 is incorporated in the projecting device 10', as an example. It is to be noted that in FIG. 12, the same reference numerals denote parts common to those in FIG. 1 and FIG. 3, and a detailed description thereof is omitted.

In the projecting device 10', beams having the wavelength A, the wavelength B, and the wavelength C (hereinafter, referred to as beams having the wavelengths) that have been emitted from the dichroic mirror 110 are incident on a polarization convertor including a light collecting element 600, a fly eye lens 601, a polarization converting element 602, a fly eye lens 603, and a light collecting element 604 on the same optical path.

To be more specific, on the polarization convertor, the beams having the wavelengths are incident on the polarization converting element 602 through the light collecting element 600 and the fly eye lens 601. The beams having the wavelengths are converted to one polarized light from non-polarized fluorescent light by the polarization converting element 602. The beams having the wavelengths that have been polarized by the polarization converting element 602 are emitted from the polarization convertor through the fly eye lens 603 and the light collecting element 604.

On the polarization convertor, the beams having the wavelengths are made to pass through the fly eye lenses 601 and 603. With this, the beams having the wavelengths can be emitted on a subsequent reflection-type liquid crystal panel 611 with substantially uniform light amount distribution. Furthermore, the beams having the wavelengths are aligned to one polarized light by the polarization converting element 602. With this, light usage efficiency on a subsequent polarization beam splitter 610 and the reflection-type liquid crystal panel 611 can be enhanced.

The light components having the wavelengths that have been output from the polarization convertor are incident on the polarization beam splitter 610 through a light collecting element 605. The polarization beam splitter 610 reflects and transmits light selectively depending on light polarization directions. The beams having the wavelengths that have been incident on the polarization beam splitter 610 are reflected in the polarization beam splitter 610 and are emitted onto the reflection-type liquid crystal panel 611.

The reflection-type liquid crystal panel 611 is driven with a driving signal generated by a driving signal generator (not illustrated) that the controller 140 has in accordance with image data that has been output from the personal computer 150 and loaded on the controller 140 by the interface 141, for example.

Polarization of the beams having the wavelengths that have been emitted onto the reflection-type liquid crystal panel 611 is controlled by the reflection-type liquid crystal panel 611 in accordance with the driving signal for each pixel and the beams are reflected. The beams having the wavelengths that have been reflected by the reflection-type liquid crystal panel 611 are incident on the polarization beam splitter 610, and transmit through and are reflected by the polarization beam splitter 610 in accordance with the controlled polarization for each pixel. The beams having the wavelengths that have transmitted through the polarization beam splitter 610 are emitted to the outside of the projecting device 10' through the projection lens 135. Then, the beams are projected onto a display medium (not illustrated) such as a screen, and an enlarged image is displayed.

Second Embodiment

Next, the second embodiment of the invention is described. In each of the above-described first embodiment and variations of the first embodiment, the phosphors are formed on one surface of the substrate. On the other hand, in the second embodiment, phosphors that emit light components of different colors are formed on both surfaces of the substrate.

Figure 13:
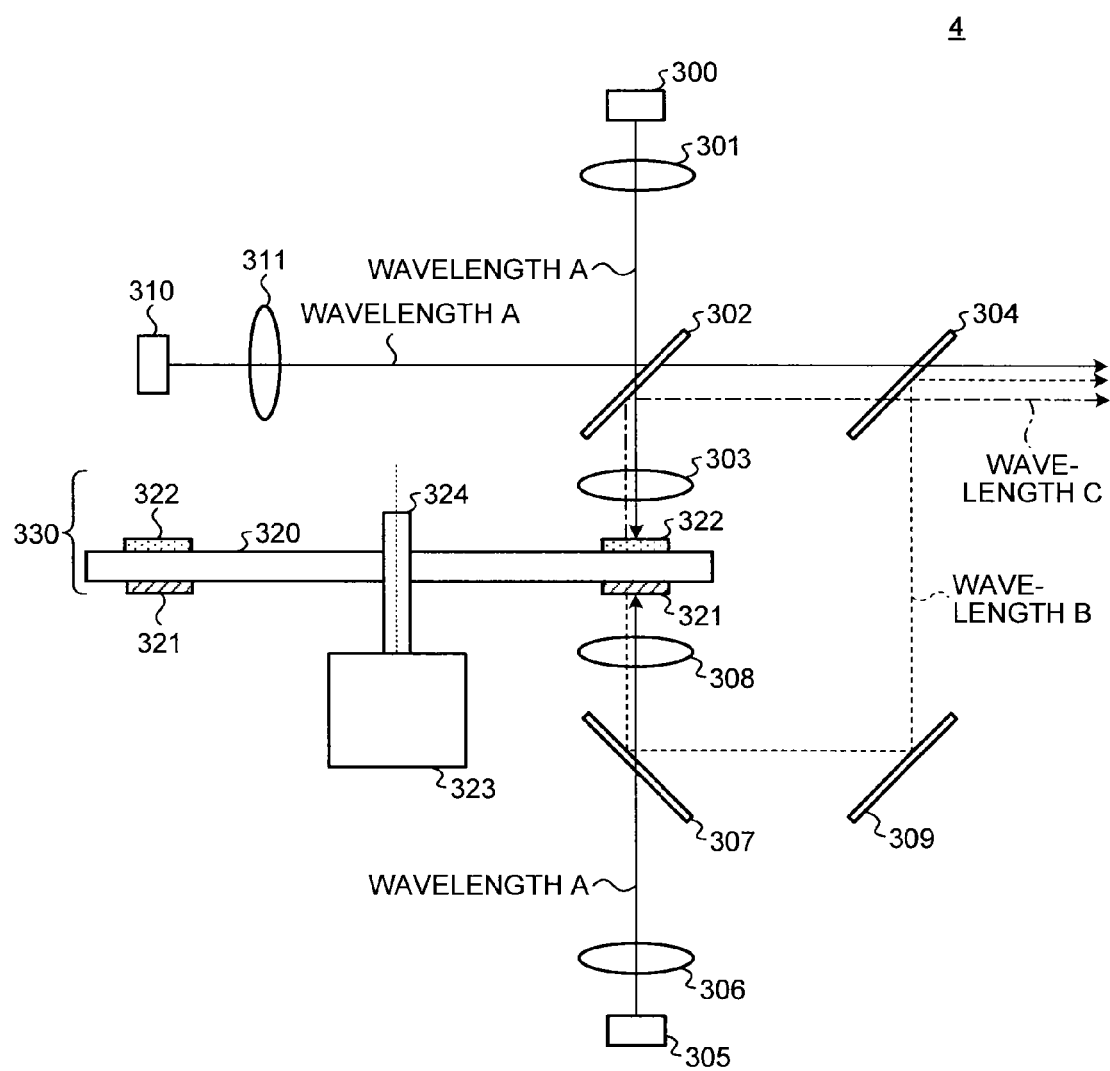
FIG. 13 is a schematic view illustrating an example of a configuration of an illuminating device according to a second embodiment.

FIG. 13 illustrates an example of a configuration of an illuminating device 4 according to the second embodiment. The illuminating device 4 includes light sources 300, 305, and 310, coupling lenses 301, 306, and 311, dichroic mirrors 302, 304, and 307, a mirror 309, and a phosphor wheel unit 330. The phosphor wheel unit 330 includes light collecting elements 303 and 308, a substrate 320, phosphors 321 and 322, and a driving unit 323.

On the phosphor wheel unit 330, the phosphor 321 that is excited by light having the wavelength A of blue and emits light having the wavelength B of red is formed on a first surface of the substrate 320 as illustrated as a cross sectional view including a rotation center 324 in FIG. 13. The phosphor 322 that is excited by light having the wavelength A of blue and emits light having the wavelength C of green is formed on a second surface at the rear side of the first surface. The substrate 320 is rotationally driven about the rotation center 324 by the driving unit 323.

In the example of FIG. 13, the phosphors 321 and 322 are formed into circular shapes having the same diameter and a predetermined width. However, the phosphors 321 and 322 are not limited thereto and the phosphor 321 and 322 may be formed to have different diameters and the widths thereof are not required to be equal to each other. When the phosphor 321 and 322 are formed to have different diameters, it is preferable that the diameter of the phosphor 322 that emits light of green be made larger than the diameter of the phosphor 321 that emits light of red.

Optical paths on the illuminating device 4 are described with reference to FIG. 13. Each of the light sources 300, 305, and 310 emits light rays having the wavelength A. The dichroic mirror 302 is configured to reflect light having the wavelength C and transmit light components having the wavelength A and the wavelength B. The dichroic mirrors 304 and 307 are configured to reflect light having the wavelength B and transmit light components having the wavelength A and the wavelength C.

First, an optical path of light from the light source 300 is described. Light rays having the wavelength A that have been emitted from the light source 300 are collimated by the coupling lens 301, transmit through the dichroic mirror 302, and are incident on the light collecting element 303. The light collecting element 303 collects the incident light rays having the wavelength A on the substrate 320, and irradiates the phosphor 322 with the collected light rays. The phosphor 322 is excited by the light rays having the wavelength A so as to emit light having the wavelength C. The light having the wavelength C is incident on the dichroic mirror 302 through the light collecting element 303. The light rays having the wavelength B are reflected by the dichroic mirror 302, transmit through the dichroic mirror 304, and are emitted from the illuminating device 4.

Next, an optical path of light from the light source 305 is described. Light rays having the wavelength A that have been emitted from the light source 305 are collimated by the coupling lens 306, transmit through the dichroic mirror 307, and are emitted onto the phosphor 321 through the light collecting element 308. The phosphor 321 is excited by the light rays having the wavelength A so as to emit light having the wavelength B. The light having the wavelength B is reflected by the dichroic mirror 307 through the light collecting element 308, is further reflected by the mirror 309, is further reflected by the dichroic mirror 304, and is emitted from the illuminating device 4.

Next, an optical path of light from the light source 310 is described. Light rays having the wavelength A that have been emitted from the light source 310 are collimated by the coupling lens 311, transmit through the dichroic mirrors 302 and 304, and are emitted from the illuminating device 4.

The dichroic mirror 302 is arranged such that the optical path of the light having the wavelength C that has been emitted from the phosphor 322 and has been reflected by the dichroic mirror 302 overlaps with the optical path of the light having the wavelength A that is incident from the light source 310 through the coupling lens 311 so as to obtain one optical path. This makes it possible to synthesize the light having the wavelength A and the light having the wavelength C. In this manner, the dichroic mirror 302 functions as an optical path controller that introduces a plurality of light components to the same optical path.

The dichroic mirror 304 transmits the light components having the wavelength A and the wavelength C, and reflects the light having the wavelength B. Accordingly, the dichroic mirror 304 is arranged such that the optical path of the light having the wavelength B overlaps with the optical path of the light emitted from the dichroic mirror 302 so as to obtain one optical path. Note that on the optical path of the light emitted from the dichroic mirror 302, the optical path of the light having the wavelength A and the optical path of the light having the wavelength C have overlapped with each other. In this case, the dichroic mirrors 302 and 304 function as optical path controllers that introduce the light components emitted from equal to or more than two light collecting elements 303 and 308 to the same optical path.

When the light rays having the wavelength A emitted from the light sources 300 and 305 are emitted onto the phosphors 321 and 322 that are formed on the substrate 320 on concentric circles in accordance with the above-described optical paths, the substrate 320 is rotationally driven by the driving unit 323. If the substrate 320 is rotationally driven, the light rays having the wavelength A from the light sources 300 and 305 are emitted onto the phosphors 321 and 322, respectively, continuously. At this time, positions onto which the light rays are emitted change temporally. Therefore, the positions of the phosphors 321 and 322 onto which the light rays having the wavelength A is emitted are dispersed so as to prevent the phosphors 321 and 322 from being damaged and deteriorated in characteristics. It is to be noted that a rotation speed of the substrate 320 is not particularly limited and needs not be constant.

A method of changing the irradiation positions of the light rays onto the phosphors 321 and 322 temporally is not limited to rotational driving of the substrate 320. That is to say, it is sufficient that the substrate 320 is driven such that the light rays are emitted onto the phosphors 321 and 322 continuously and the irradiation positions are returned at a predetermined cycle. As an example, it is considered that the substrate 320 is vibration-driven vertically with respect to the light ray incident direction.

The illuminating device 4 according to the second embodiment can be used by being incorporated into the projecting device 10 in the same manner as the illuminating device 1 according to the first embodiment, and can be controlled in the same manner. Therefore, a detailed description thereof is omitted. Furthermore, a relationship between control for obtaining emitted light components of the colors of R, G, and B and an image frame is also the same as the control as described with reference to FIG. 4.

Furthermore, in the second embodiment, the light collecting elements 308 and 303 are arranged for the phosphors 321 and 322, respectively, thereby collecting light components that are emitted from the phosphors 321 and 322 efficiently. In addition, in the second embodiment, the light collecting elements 303 and 308 may selectively collect light components having wavelengths that are emitted from the phosphors 321 and 322, respectively, for the light components that are incident from the phosphors 321 and 322.

Variation of Second Embodiment

Next, the variation of the second embodiment of the invention is described. In the above-described second embodiment, optical systems for the light sources 300 and 305 are configured such that a distance between irradiation positions of the light rays onto the phosphors 321 and 322 of the colors on the substrate 320 is the shortest. In contrast, in the variation of the second embodiment, optical systems for the light sources 300 and 305 are configured such that a distance between the irradiation positions is longer in the same manner as the above-described second variation of the first embodiment.

Figure 14:
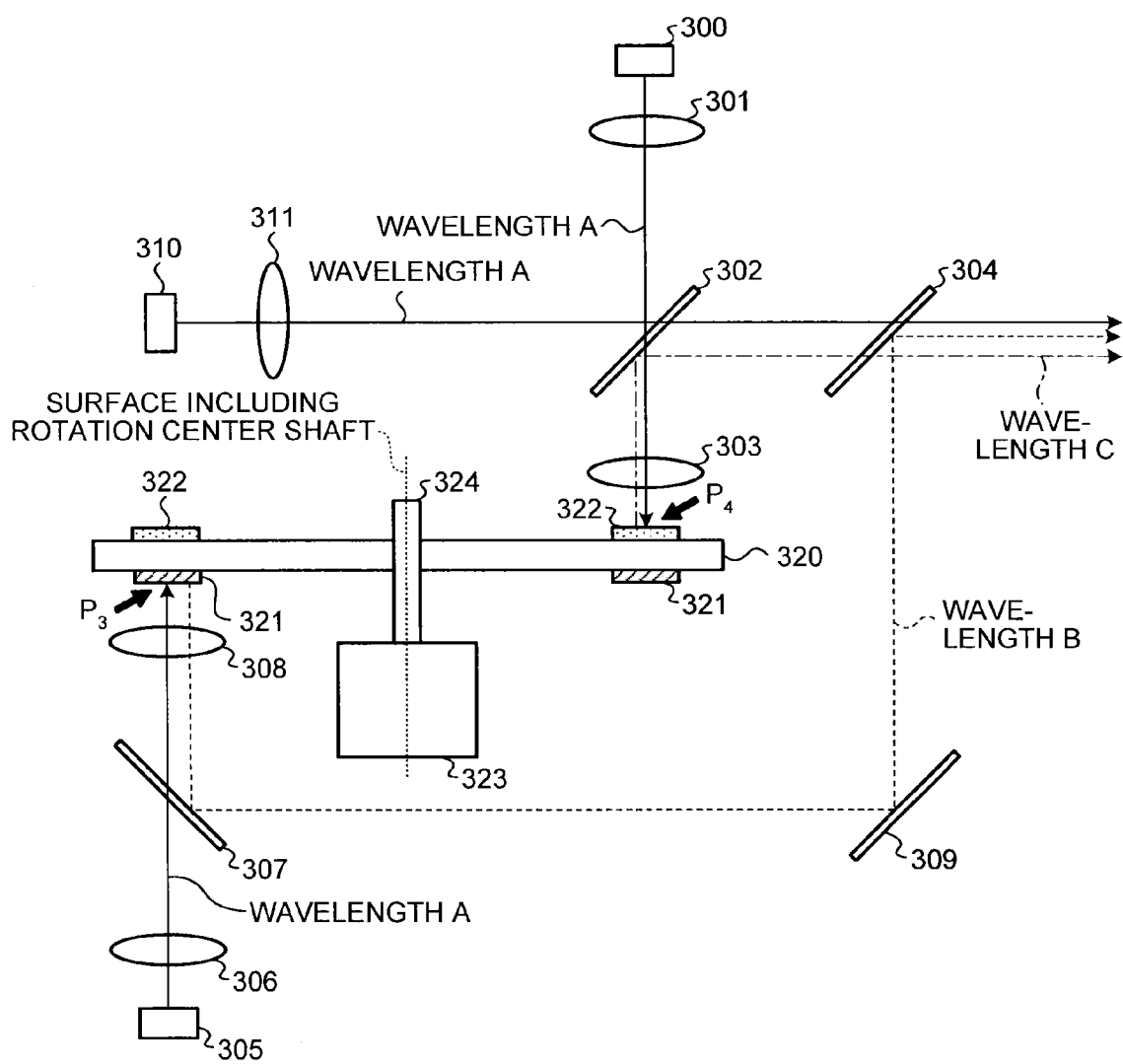
FIG. 14 is a schematic view illustrating an example of a configuration of an illuminating device according to a variation of the second embodiment.

FIG. 14 illustrates an example of a configuration of an illuminating device 5 according to the variation of the second embodiment. In FIG. 14, the same reference numerals denote parts common to those in FIG. 13, and a detailed description thereof is omitted. In the variation of the second embodiment, a configuration of the substrate 320 to be used in the phosphor wheel unit 330 is the same as that as described in the above-described second embodiment.

As illustrated in FIG. 14, in the variation of the second embodiment, the optical systems for the light sources 300 and 305 are arranged such that an irradiation position $P_3$ of the light rays onto the phosphor 321 and an irradiation position $P_4$ of the light rays onto the phosphor 322 on the substrate 320 sandwich a surface including the axis of the rotation center 324 of the substrate 320. Since the positional relationship between the irradiation position $P_3$ and the irradiation position $P_4$ is realized in this manner, a distance between the irradiation position $P_3$ and the irradiation position $P_4$ becomes longer beyond the shortest distance.

Furthermore, the irradiation position $P_3$ and the irradiation position $P_4$ are arranged on the diameter of the substrate 320 so as to sandwich the rotation center 324. With this, the distance between the irradiation position $P_3$ and the irradiation position $P_4$ can be made maximum. It is to be noted that the irradiation position $P_3$ and the irradiation position $P_4$ may not necessarily sandwich the surface including the axis of the rotation center 324.

In this manner, even when the phosphors 321 and 322 are formed on both surfaces of the substrate 320, if the irradiation position $P_3$ of the light rays onto the phosphor 321 and the irradiation position $P_4$ of the light rays onto the phosphor 322 are distanced from each other such that the distance therebetween is longer, heat generated by irradiation of the light rays is dissipated, thereby emitting light stably.

The illuminating device 5 according to the variation of the second embodiment can be used by being incorporated into the projecting device 10 in the same manner as the illuminating device 1 according to the first embodiment, and can be controlled in the same manner. Therefore, a detailed description thereof is omitted. Furthermore, a relationship between control for obtaining emitted light components of the colors of R, G, and B and an image frame is also the same as the control as described with reference to FIG. 4.

Furthermore, in the variation of the second embodiment, the light collecting elements 308 and 303 are arranged for the phosphors 321 and 322, respectively, thereby collecting light components that are emitted from the phosphors 321 and 322 efficiently. In addition, in the variation of the second embodiment, the light collecting elements 308 and 303 may also selectively collect light components having wavelengths that are emitted from the phosphors 321 and 322, respectively, for the light components that are incident from the phosphors 321 and 322.

In any of the above-described first embodiment, second embodiment, variation of the second embodiment, the light collecting element that collects exciting light also serves as the light collecting element that collects light emitted by fluorescence. However, this configuration is an example when the exciting light and the fluorescent light are at the same side with respect to the phosphor or the substrate for the substrate on which the phosphor is formed. This configuration is not necessarily intended to narrow a range of a scope of the invention. That is to say, a range in which the invention is applied also encompasses a configuration in which an element that collects exciting light and an element that collects light emitted by fluorescence are separated from each other. The configuration is employed when light emitted from a phosphor passes through a transparent substrate such as a glass substrate or when the exciting light is emitted from a rear surface of the transparent substrate in a case where the light emitted from the phosphor on reception of the irradiation of the exciting light passes through the substrate such as a case where the phosphor is formed on the transparent substrate.

Third Embodiment

Next, the third embodiment is described. In each of the above-described first embodiment, second embodiment and variations of the embodiments, a plurality of phosphors that emit light components of different colors are formed on a disk on concentric circles. In contrast, in the third embodiment, a columnar drum is used as a substrate, a plurality of phosphors that emit light components of different colors are formed to be aligned in the height direction of the column along the side surface of the drum.

Figure 15:
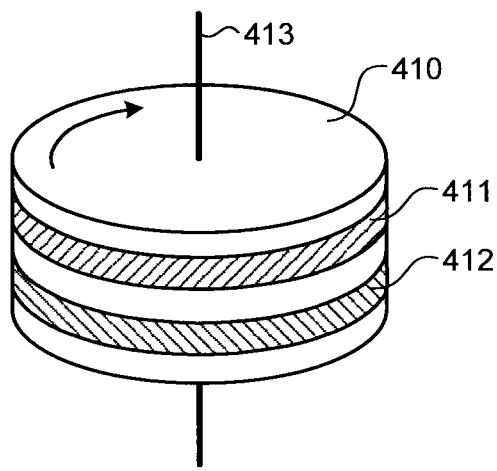
FIG. 15 is a schematic view schematically illustrating a drum as a substrate on which phosphors are formed according to a third embodiment.

FIG. 15 illustrates a drum 410 as a substrate on which phosphors are formed schematically according to the third embodiment. A phosphor 411 and a phosphor 412 that emit light components of different colors are formed along the side surface of the drum 410 at a predetermined width. Furthermore, the drum 410 is rotationally driven about an axis 413 passing through the centers of bottom surfaces as a rotating center.

Figure 16:
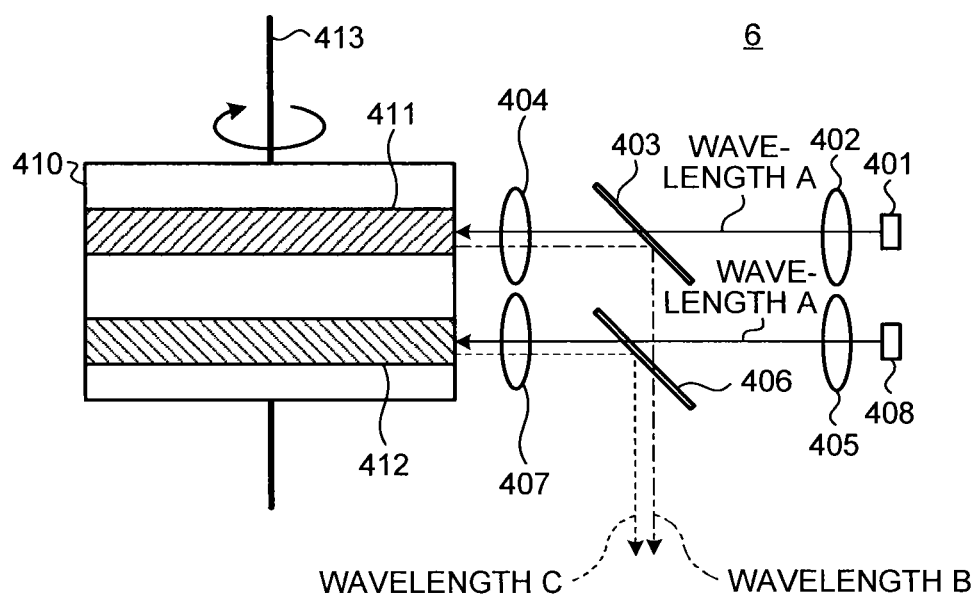
FIG. 16 is a schematic view illustrating an example of a configuration of an illuminating device according to the third embodiment.

FIG. 16 illustrates an example of a configuration of an illuminating device 6 according to the third embodiment. The illuminating device 6 has the drum 410 on which the phosphors 411 and 412 are formed on the side surface of a column, light sources 401 and 408, coupling lenses 402 and 405, dichroic mirrors 403 and 406, and light collecting elements 404 and 407. In FIG. 16, optical paths of light rays that are not emitted onto the phosphors 411 and 412 are not illustrated.

Each of the light sources 401 and 408 emits light rays having the wavelength A of blue. The phosphor 411 is excited by light having the wavelength A so as to emit light having the wavelength B of red. The phosphor 412 is excited by light having the wavelength A so as to emit light having the wavelength C of green. The dichroic mirror 403 reflects light rays having the wavelength B, and transmits light rays having the wavelength A and the wavelength C. The dichroic mirror 406 reflects light rays having the wavelength C, and transmits light rays having the wavelength A and the wavelength B.

Each of the light collecting elements 404 and 407 is configured to transmit light having a predetermined wavelength selectively. In this example, the light collecting element 404 can transmit light having the wavelength A that is incident from the side of the light source 401, and transmit light having the wavelength B that is incident from the side of the phosphor 411. The light collecting element 407 can transmit light having the wavelength A that is incident from the side of the light source 408, and transmit light having the wavelength C that is incident from the side of the phosphor 412.

Note that the light collecting element 404 and the light collecting element 407 may be a lens array in which a first lens that collects the incident light rays having the wavelength A on the drum 410 and irradiates the phosphor 411 with the collected light rays, and a second lens that collects the incident light rays having the wavelength A on the drum 410 and irradiates the phosphor 412 with the collected light rays are configured integrally.

Optical paths on the illuminating device 6 are described. First, an optical path of light from the light source 401 is described. Light rays having the wavelength A that have been emitted from the light source 401 are collimated by the coupling lens 402, and emitted on the phosphor 411 through the dichroic mirror 403 and the light collecting element 404. The phosphor 411 is excited by the light rays having the wavelength A so as to emit light having the wavelength B. The light having the wavelength B is collected by the light collecting element 404 selectively, and is emitted to the dichroic mirror 403. The light having the wavelength B is reflected by the dichroic mirror 403, transmits through the dichroic mirror 406, and is emitted from the illuminating device 6.

An optical path of light from the light source 408 is similar to the optical path of light from the light source 401. That is to say, light rays having the wavelength A emitted from the light source 408 are collimated by the coupling lens 405, and emitted on the phosphor 412 through the dichroic mirror 406 and the light collecting element 407. The phosphor 412 is excited by the light rays having the wavelength A so as to emit light having the wavelength C. The light having the wavelength C is collected by the light collecting element 407 selectively, and is emitted to the dichroic mirror 406. The light having the wavelength C is reflected by the dichroic mirror 406, and is emitted from the illuminating device 6.

The dichroic mirror 406 is arranged such that the optical path of the light having the wavelength C that has been emitted from the phosphor 412 and has been reflected by the dichroic mirror 406 overlaps with the optical path of the light having the wavelength B that is incident from the dichroic mirror 403 so as to obtain one optical path. This makes it possible to synthesize the light having the wavelength B and the light having the wavelength C. In this manner, the dichroic mirror 406 functions as an optical path controller that introduces the light components emitted from equal to or more than two light collecting elements 404 and 407 to the same optical path.

When the light rays emitted from the light sources 401 and 408 are emitted onto the phosphors 411 and 412, respectively, that are formed on the drum 410 in accordance with the above-described optical paths, the drum 410 is rotationally driven about the axis 413 by a driving unit (not illustrated). If the drum 410 is rotationally driven, positions onto which the light rays from the light sources 401 and 408 are emitted onto the phosphors 411 and 412, respectively, change temporally. Therefore, the positions of the phosphors 411 and 412 onto which the light rays are emitted are dispersed so as to prevent the phosphors 411 and 412 from being damaged and deteriorated in characteristics. It is to be noted that a rotation speed of the drum 410 is not particularly limited and needs not be constant.

A columnar drum is used as a substrate, phosphors are formed along the side surface of the drum. With this, when the substrate, that is, the drum is rotationally driven, linear speeds of the phosphors with respect to the light rays to be emitted onto the phosphors are equal to one another. Therefore, a space between the phosphors can be set freely. That is to say, dependency is not present between a rotation speed of the drum and coating amounts of the phosphors and the space between the phosphors so that the degree of freedom in layout is improved.

In FIG. 15 and FIG. 16, the phosphors 411 and 412 for two colors of R and G are formed on the drum 410. However, the invention is not limited to the example. That is to say, as in the first variation of the first embodiment, phosphors of colors of R, G, and B may be formed on the drum 410 and the phosphors may be excited with ultraviolet light.

The illuminating device 6 according to the third embodiment can be used by being incorporated into the projecting device 10 in the same manner as the illuminating device 1 according to the first embodiment, and can be controlled in the same manner. Therefore, a detailed description thereof is omitted. Furthermore, a relationship between control for obtaining emitted light components of the colors of R, G, and B and an image frame is also the same as the control as described with reference to FIG. 4.

Furthermore, in the third embodiment, the light collecting elements 404 and 407 are provided for the phosphors 411 and 412, respectively. Therefore, the light collecting elements 404 and 407 can be configured so as to be suitable to light components having different wavelengths. This makes it possible to collect light emitted from the phosphors 411 and 412 more efficiently.

The embodiment has an advantageous effect of reducing the size of a device in which a phosphor is excited to obtain light of each color at lower cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illuminating device for emitting light onto a light modulating element that forms an image in accordance with a modulation signal and irradiates a target to be illuminated with light, the illuminating device comprising:
   a substrate on which equal to or more than two phosphors that emit light with exciting light are formed in a band-like form along a predetermined direction;
   equal to or more than two light collecting units that are arranged for the respective equal to or more than two phosphors, and collect light components emitted from the respective equal to or more than two phosphors;
   equal to or more than two light sources; and
   a driving unit that drives the substrate in the predetermined direction,
   wherein the equal to or more than two phosphors are formed on the substrate on concentric circles,
   the driving unit rotationally drives the substrate about center of the concentric circles as an axis, and
   a respective light from the equal to or more than two light sources are irradiated into respective different circles that are in the concentric circle.

2. The illuminating device according to claim 1, further comprising an optical path controller that introduces light components emitted from the equal to or more than two collecting units to the same optical path.

3. The illuminating device according to claim 1, wherein the equal to or more than two phosphors include a phosphor that emits light of green, and
 on the substrate, the phosphor that emits light of green is formed on the concentric circles at an outer circumferential side with respect to phosphors that emit light components of other colors.

4. The illuminating device according to claim 1, wherein the equal to or more than two phosphors are formed by being assigned to a first surface and a second surface of the substrate.

5. The illuminating device according to claim 1, wherein for each of a first phosphor and a second phosphor that are adjacent to each other among the equal to or more than two phosphors, a space between an irradiation position of the exciting light onto the first phosphor and an irradiation position of the exciting light onto the second phosphor is made minimum.

6. The illuminating device according to claim 1, wherein for each of a first phosphor and a second phosphor that are adjacent to each other among the equal to or more than two phosphors, a space between an irradiation position of the exciting light onto the first phosphor and an irradiation position of the exciting light onto the second phosphor is made maximum.

7. The illuminating device according to claim 1, wherein the substrate is columnar and the equal to or more than two phosphors are formed along a side surface of the column, and
 the driving unit rotationally drives the substrate about center of each bottom surface of the column as an axis.

8. The illuminating device according to claim 1, wherein the equal to or more than two light collecting units further collect the exciting light so as to emit the collected exciting light onto the respective equal to or more than two phosphors.

9. The illuminating device according to claim 1, further comprising equal to or more than two light sources that emit exciting light to the respective equal to or more than two phosphors.

10. The illuminating device according to claim 1, further comprising an optical path switching unit that switches an irradiation target of light from one light source among the equal to or more than two phosphors.

11. A projecting device that projects the image based on image data, the projecting device comprising:
 the illuminating device according to claim 1;
 equal to or more than two light sources that irradiate the respective equal to or more than two phosphors with the exciting light;
 a projecting optical system that projects light components that have been emitted from the equal to or more than two phosphors and collected by the equal to or more than two light collecting units onto a display medium; and
 a controller that controls the equal to or more than two light sources to light up sequentially in one frame period of the image data.

12. The projecting device according to claim 11, wherein the controller controls at least two light sources to light up at the same time among the equal to or more than two light sources in the one frame period.

13. A method for controlling a projecting device that projects an image based on image data, the method comprising:
 driving, by a driving unit, a substrate on which equal to or more than two phosphors that emit light with exciting light are formed in a band-like form along a predetermined direction; and
 controlling, by a controller, equal to or more than two light sources that irradiate the respective equal to or more than two phosphors that are formed on the substrate on concentric circles with the exciting light to light up sequentially in one frame period of the image data.

14. The illuminating device according to claim 1, wherein two circles are simultaneously irradiated with excitation light.

15. An illuminating device for emitting light onto a light modulating element that forms an image in accordance with a modulation signal and irradiates a target to be illuminated with light, the illuminating device comprising:
 a substrate on which equal to or more than two phosphors that emit light with exciting light are formed in a band-like form along a predetermined direction;
 equal to or more than two light collecting units that are arranged for the respective equal to or more than two phosphors, and collect light components emitted from the respective equal to or more than two phosphors; and
 a driving unit that drives the substrate in the predetermined direction,
 wherein for each of a first phosphor and a second phosphor that are adjacent to each other among the equal to or more than two phosphors, a space between an irradiation position of the exciting light onto the first phosphor and an irradiation position of the exciting light onto the second phosphor is made minimum.

16. An illuminating device for emitting light onto a light modulating element that forms an image in accordance with a modulation signal and irradiates a target to be illuminated with light, the illuminating device comprising:
 a substrate on which equal to or more than two phosphors that emit light with exciting light are formed in a band-like form along a predetermined direction;
 equal to or more than two light collecting units that are arranged for the respective equal to or more than two phosphors, and collect light components emitted from the respective equal to or more than two phosphors; and
 a driving unit that drives the substrate in the predetermined direction,
 wherein for each of a first phosphor and a second phosphor that are adjacent to each other among the equal to or more than two phosphors, a space between an irradiation position of the exciting light onto the first phosphor and an irradiation position of the exciting light onto the second phosphor is made maximum.

17. A light path for an illuminating device for emitting light onto a light modulating element that forms an image in accordance with a modulation signal and irradiates a target to be illuminated with light, the light path comprising:
 a substrate on which equal to or more than two phosphors that emit light with exciting light are formed in a band-like form along a predetermined direction:
 equal to or more than two light collecting units that are arranged for the respective equal to or more than two phosphors, and collect light components emitted from the respective equal to or more than two phosphors;
 a driving unit that drives the substrate in the predetermined direction,
 wherein the equal to or more than two phosphors are formed on the substrate on concentric circles,
 the driving unit rotationally drives the substrate about center of the concentric circles as an axis, and
 a respective light are irradiated into respective different circles that are in the concentric circle.

* * * * *